US012225377B2

(12) United States Patent
Lehtovirta et al.

(10) Patent No.: US 12,225,377 B2
(45) Date of Patent: Feb. 11, 2025

(54) METHODS FOR TRUST INFORMATION IN COMMUNICATION NETWORK AND RELATED COMMUNICATION EQUIPMENT AND COMMUNICATION DEVICE

(71) Applicant: Telefonaktiebolaget LM Ericsson (publ), Stockholm (SE)

(72) Inventors: Vesa Lehtovirta, Espoo (FI); Prajwol Kumar Nakarmi, Sollentuna (SE); Helena Vahidi Mazinani, Lund (SE); Noamen Ben Henda, Vällingby (SE); Markus Hanhisalo, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 376 days.

(21) Appl. No.: 17/774,896

(22) PCT Filed: Nov. 9, 2020

(86) PCT No.: PCT/SE2020/051081
§ 371 (c)(1),
(2) Date: May 6, 2022

(87) PCT Pub. No.: WO2021/096410
PCT Pub. Date: May 20, 2021

(65) Prior Publication Data
US 2022/0394473 A1 Dec. 8, 2022

(51) Int. Cl.
*H04W 12/082* (2021.01)
*H04W 8/06* (2009.01)
(Continued)

(52) U.S. Cl.
CPC .......... *H04W 12/082* (2021.01); *H04W 8/06* (2013.01); *H04W 12/069* (2021.01);
(Continued)

(58) Field of Classification Search
CPC .............. H04W 12/06; H04W 12/069; H04W 12/0431; H04W 12/0433; H04W 48/20
See application file for complete search history.

(56) References Cited

U.S. PATENT DOCUMENTS

2011/0025632 A1  2/2011  Lee
2011/0225632 A1  9/2011  Ropolyi et al.
(Continued)

FOREIGN PATENT DOCUMENTS

CN   101730172 A  *  6/2010
WO   2009126083 A1    10/2009
(Continued)

OTHER PUBLICATIONS

International Search Report and Written Opinion of the International Searching Authority for PCT International Application No. PCT/SE2020/051081 dated Mar. 10, 2021.
(Continued)

*Primary Examiner* — Kevin Kim
(74) *Attorney, Agent, or Firm* — Sage Patent Group

(57) ABSTRACT

A method performed by a network equipment of a communication network to dynamically provide trust information to a communication device registered or being registered to the communication network is provided. The method includes determining a trust information for each of one or more access networks. The trust information indicates whether each of the one or more access networks is trusted. The method further includes indicating to the communication device whether the one or more access networks is trusted for a current session or a later session. A method performed by a communication device registered or being registered with a communication network to dynamically receive trust information is also provided. The method includes receiving a message including a protected trust information list from a network equipment. The method further includes verifying the protection of the message. The method further includes storing the protected trust information list.

19 Claims, 18 Drawing Sheets

(51) Int. Cl.
  *H04W 12/069* (2021.01)
  *H04W 12/60* (2021.01)
  *H04W 60/00* (2009.01)
  *H04W 84/04* (2009.01)

(52) U.S. Cl.
  CPC ........... *H04W 12/66* (2021.01); *H04W 60/00* (2013.01); *H04W 84/042* (2013.01)

(56) References Cited

U.S. PATENT DOCUMENTS

| | | |
|---|---|---|
| 2012/0322412 A1 | 12/2012 | Qiang |
| 2014/0096193 A1 | 4/2014 | Naeslund et al. |
| 2014/0149741 A1 | 5/2014 | Balakrishnan et al. |
| 2017/0055302 A1 | 2/2017 | Wang et al. |
| 2019/0028873 A1 | 1/2019 | Drevon et al. |
| 2019/0335333 A1 | 10/2019 | Sohail et al. |
| 2020/0280849 A1 | 9/2020 | Ito et al. |

FOREIGN PATENT DOCUMENTS

| | | |
|---|---|---|
| WO | 2017182057 A1 | 10/2017 |
| WO | 2019065897 A1 | 4/2019 |
| WO | 2020037665 A1 | 2/2020 |

OTHER PUBLICATIONS

3GPP TS 33.501 V16.0.0, "3rd Generation Partnership Project; Technical Specification Group Services and System Aspects; Security architecture and procedures for 5G system (Release 16)," Sep. 2019, 196 pages.

3GPP TS 23.502 V16.2.0, "3rd Generation Partnership Project; Technical Specification Group Services and System Aspects; Procedures for the 5G System (5GS); Stage 2 (Release 16)," Sep. 2019, 525 pages.

3GPP TS 33.402 V15.1.0, "3rd Generation Partnership Project; Technical Specification Group Services and System Aspects; 3GPP System Architecture Evolution (SAE); Security aspects of non-3GPP accesses (Release 15)," Jun. 2018, 72 pages.

3GPP TS 23.501 V16.2.0, "3rd Generation Partnership Project; Technical Specification Group Services and System Aspects; System Architecture for the 5G System (5GS); Stage 2 (Release 16)," Sep. 2019, 391 pages.

Office Action mailed Mar. 7, 2024 for Indian Patent Application No. 202247035528, 7 pages.

Extended European Search Report mailed Oct. 16, 2023 for European Application No. 20886366.2; 13 pages.

Communication pursuant to Rules 70(2) and 70a(2) EPC mailed Nov. 3, 2023 for European Application No. 20886366.2; 1 page.

Huawei; "Access Type and RAT Type per Non-3GPP Accesses"; 3GPP TSG-WG SA2 Meeting #136; S2-1911335; Reno, Nevada; Nov. 18-22, 2019; 6 pages.

\* cited by examiner

METHODS FOR TRUST INFORMATION IN COMMUNICATION NETWORK AND RELATED COMMUNICATION EQUIPMENT AND COMMUNICATION DEVICE

TECHNICAL FIELD

The disclosure relates generally to communications, and more particularly to a method performed by a network equipment of a communication network to dynamically provide trust information to a communication device registered or being registered to the communication network. Other methods, as well as a communication device, a network equipment, computer programs and computer program products are also disclosed.

BACKGROUND

The 5G system includes the 5G core network (5GC) and access network (AN). The 5G system architecture is specified in 3rd Generation Partnership Project (3GPP) TS 23.501 v. 16.2.0 and 3GPP TS 23.502 v. 16.2.0. There are two types of ANs, 3GPP access networks and non-3GPP access networks. The former are the access networks specified in 3GPP specifications, such as the NG-RAN (next-generation radio access network) specified in the 38-series of 3GPP specifications, and the latter are the access networks specified in other standards organizations than 3GPP, such as the wireless local-area network (WLAN) networks specified in the Institute of Electrical and Electronics Engineers (IEEE).

User equipment (UE) can connect to the 5GC via 3GPP access networks or non-3GPP access networks. Non-3GPP access networks are further divided into trusted and untrusted non-3GPP access networks. Whether a non-3GPP access network is considered as trusted or untrusted is the decision of the home operator of the subscriber. For example, the home operator A of a subscriber X may consider a WLAN access network (i.e. a non-3GPP access network) of operator B to be trusted while the home operator C of subscriber Y may consider the same WLAN access network of operator B as untrusted. This is described in clauses 4.2 and 4.3 in 3GPP TS 33.402 v. 15.1.0.

FIG. 1 illustrates an example of a non-roaming architecture for 5G Core Network with untrusted non-3GPP access from FIG. 4.2.8.2.1-1 of 3GPP TS 23.501 v. 16.2.0.

FIG. 2 illustrates an example of non-roaming architecture for 5G Core Network with trusted non-3GPP access from FIG. 4.2.8.2.1-2 of 3GPP TS 23.501 v. 16.2.0.

SUMMARY

An object of the invention is to provide trust information to a communication device registered or being registered to a communication network in a dynamic way (i.e., basically at any time) indicating whether an access network (e.g., a PLMN/access technology combination) is considered trusted or not. The trust information includes a trust status of the access network. An aspect of the present disclosure is directed to a method performed by a network equipment of a communication network to dynamically provide trust information to a communication device registered or being registered to the communication network.

The method includes determining a trust information for each of one or more access networks. The trust information indicates whether each of the one or more access networks is trusted. The method further includes indicating to the communication device whether the one or more access networks is trusted for a current session or a later session.

Another aspect of the present disclosure is directed to a network equipment. The network equipment includes processing circuitry and memory coupled with the processing circuitry. The memory includes instructions that when executed by the processing circuitry causes the network equipment to perform operations including determining a trust information for each of one or more access networks. The trust information indicates whether each of the one or more access networks is trusted. The operations further include indicating to a communication device registered or being registered with the communication network whether the one or more access networks is trusted for a current session or a later session.

Another aspect of the present disclosure is directed to a computer program including program code to be executed by processing circuitry of a network equipment. Execution of the program code causes the network equipment to perform operations including determining a trust information for each of one or more access networks. The trust information indicates whether each of the one or more access networks is trusted. The operations further include indicating to a communication device registered or being registered with the communication network whether the one or more access networks is trusted for a current session or a later session.

Another aspect of the present disclosure is directed to a computer program product including a non-transitory storage medium including program code to be executed by processing circuitry of a network equipment. Execution of the program code causes the network equipment to perform operations including determining a trust information for each of one or more access networks. The trust information indicates whether each of the one or more access networks is trusted. The operations further include indicating to a communication device registered or being registered with the communication network whether the one or more access networks is trusted for a current session or a later session.

Another aspect of the present disclosure is directed to a method performed by a communication device registered or being registered with a communication network to dynamically receive trust information. The method includes receiving a message including a protected trust information list from a network equipment. The method further includes verifying the protection of the message. The method further includes storing the protected trust information list.

Another aspect of the present disclosure is directed to a communication device registered or being registered with a communication network adapted to perform operations including receiving a message including a protected trust information list from a network equipment. The operations further include verifying the protection of the message. The operations further include storing the protected trust information list.

Another aspect of the present disclosure is directed to a computer program comprising program code to be executed by processing circuitry of a communication device registered or being registered with a communication network. Execution of the program code causes the communication device to perform operations including receiving a message including a protected trust information list from a network equipment. The operations further include verifying the protection of the message. The operations further include storing the protected trust information list.

Another aspect of the present disclosure is directed to a computer program product including a non-transitory storage medium including program code to be executed by processing circuitry of a communication device registered or being registered with a communication network. Execution of the program code causes the communication node to perform operations including receiving a message including a protected trust information list from a network equipment. The operations further include verifying the protection of the message. The operations further include storing the protected trust information list.

Various embodiments of the present disclosure may provide a potential advantage of providing a dynamic way of providing trust information to a communication device registered or being registered with a communication network. In various embodiments, a communication network operator can send trust information basically at any time to a communication device if the communication device is registered or being registered to the communication network (e.g., a 5G core network (5GC)). As it is expected that a plethora of different non-3GPP access networks will be used to connect to a communication network (e.g., 5GC), various embodiments of the present disclosure may be dynamic enough to provide the trust information for such a plethora of different non-3GPP access networks to communication devices.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
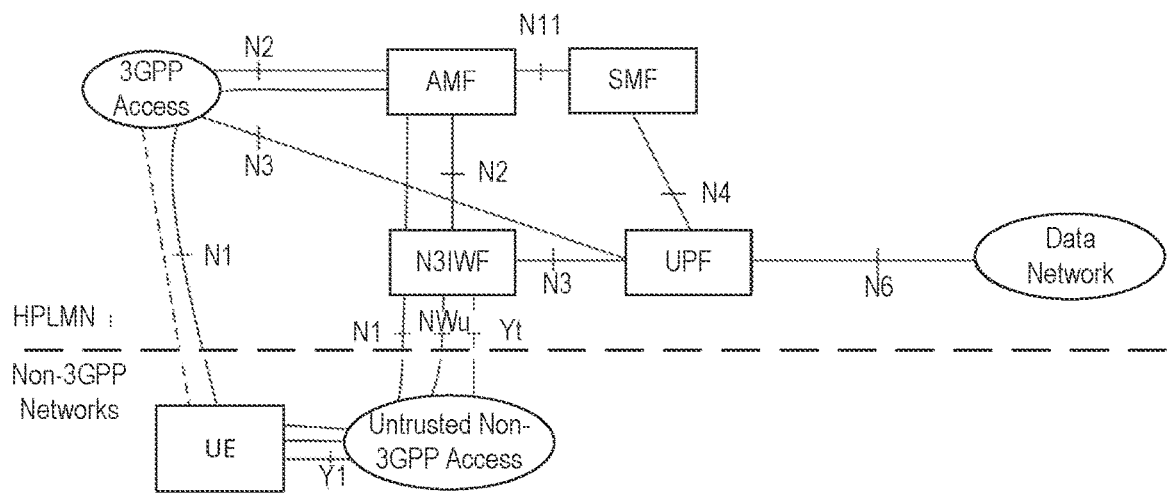
FIG. 1 illustrates an example of a non-roaming architecture for 5G Core Network with untrusted non-3GPP access.
Figure 2:
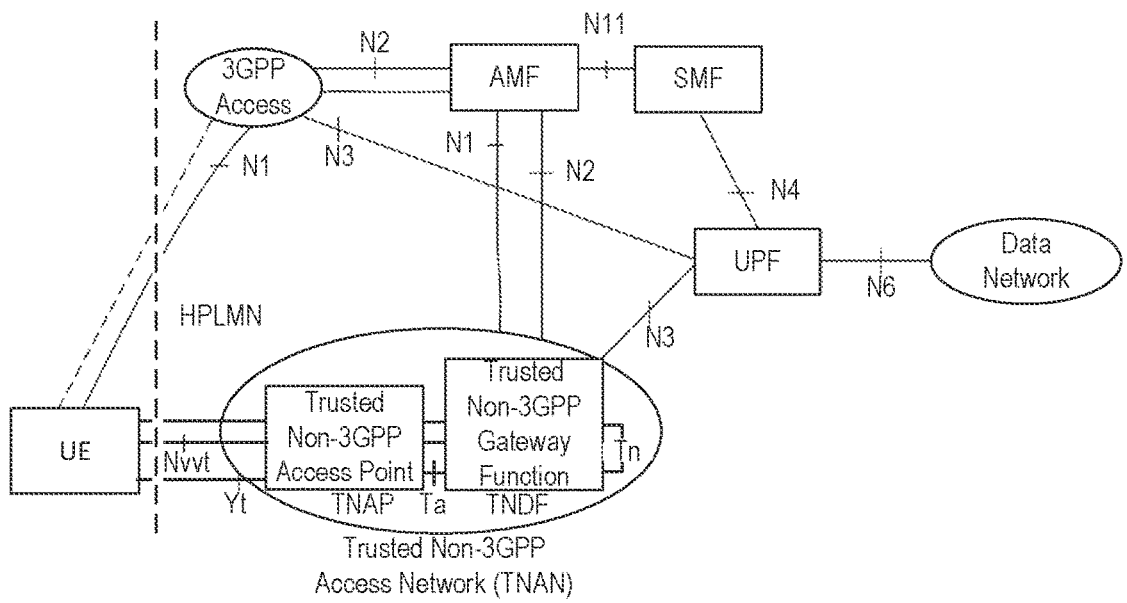
FIG. 2 illustrates an example of non-roaming architecture for 5G Core Network with trusted non-3GPP access.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Depending on the trust status of a non-3GPP access network, a UE connecting via that non-3GPP access network to e.g. 5GC needs to use different procedures. In more detail, in case of untrusted access network the UE currently needs to set-up an Internet Protocol Security (IPsec) tunnel with encryption over the non-3GPP access network to 5GC. In case of trusted access network, the UE can rely more on the security mechanisms of the access network and an IPsec tunnel with encryption is not needed. The procedures for connecting over trusted and untrusted non-3GPP access networks are specified in 3GPP TS 23.501 v.16.2.0 and 3GPP TS 23.502 v.16.2.0 for a 3GPP 5G network. The security procedures are specified in 3GPP TS 33.501 v. 16.0.0. At the present time, the security procedures for trusted access are to be included in 3GPP TS 33.501 in the future.

Potential problems with some approaches may include the following:

In order to know which procedures to use to connect to a non-3GPP access network, the UE needs to know if the home operator considers this non-3GPP access network as trusted or untrusted. The current mechanisms for 4G are specified in 33.402 v.15.1.0. It is expected that similar mechanisms will be used for 5G but those have not been specified yet. The current mechanisms are described as follows in TS 33.402 v.15.1.0, clause 6.1, which states:

"The non-3GPP access networks, which are trusted, can be pre-configured in the UE. The UE can e.g. have a list with non-3GPP access technologies, or access networks, or serving network operators that allow procedures for trusted non-3GPP IP access. Additionally, during 3GPP-based access authentication the UE may receive an indication whether the non-3GPP IP access is trusted or not. If such an indication is sent it shall be sent by the 3GPP AAA server as part of an EAP-AKA or EAP-AKA' request. If no such indication is received by the UE, and there is no pre-configured information in the UE, the UE shall consider the non-3GPP IP access as untrusted. In case of pre-configured information and indication received as part of an EAP-AKA or EAP-AKA' request are in conflict, the received indication shall take precedence."

The existing specifications allow pre-configuration (with non-specified mechanism) of the trust information or sending a trust indication during the access authentication from the authentication server to the UE.

As it is expected that a plethora of different non-3GPP access networks will be used to connect to 5GC, the current mechanisms may not be dynamic enough to provide the trust information to UEs.

The 5G key hierarchy is such that it produces a key Kausf which is left in the home network as a result of a successful primary authentication. This has enabled two new mechanisms to send information from the home network to the UE: steering of roaming (SoR) and UE parameter update. Various embodiments of the present disclosure can be applied to some of these procedures to send the trust information from the home network to the UE.

Various embodiments provide a method performed by a network equipment of a communication network to dynamically provide trust information to a communication device. The operations performed by the network equipment can include determining a trust information for each of one or more access networks. The trust information indicates whether each of the one or more access networks is trusted. The operations performed by the network equipment can further include indicating to the communication device whether the one or more access networks is trusted for a current session or a later session.

Various embodiments of the present disclosure may provide the following advantages. Various embodiments may present a dynamic way of providing trust information to the UEs. The home operator can send trust information basically at any time to a UE if the UE is registered to the 5G core network.

In various embodiments, a unified data management (UDM) node of a communication network may be configured to perform operations to dynamically provide trust information to a communication device.

Figure 3:
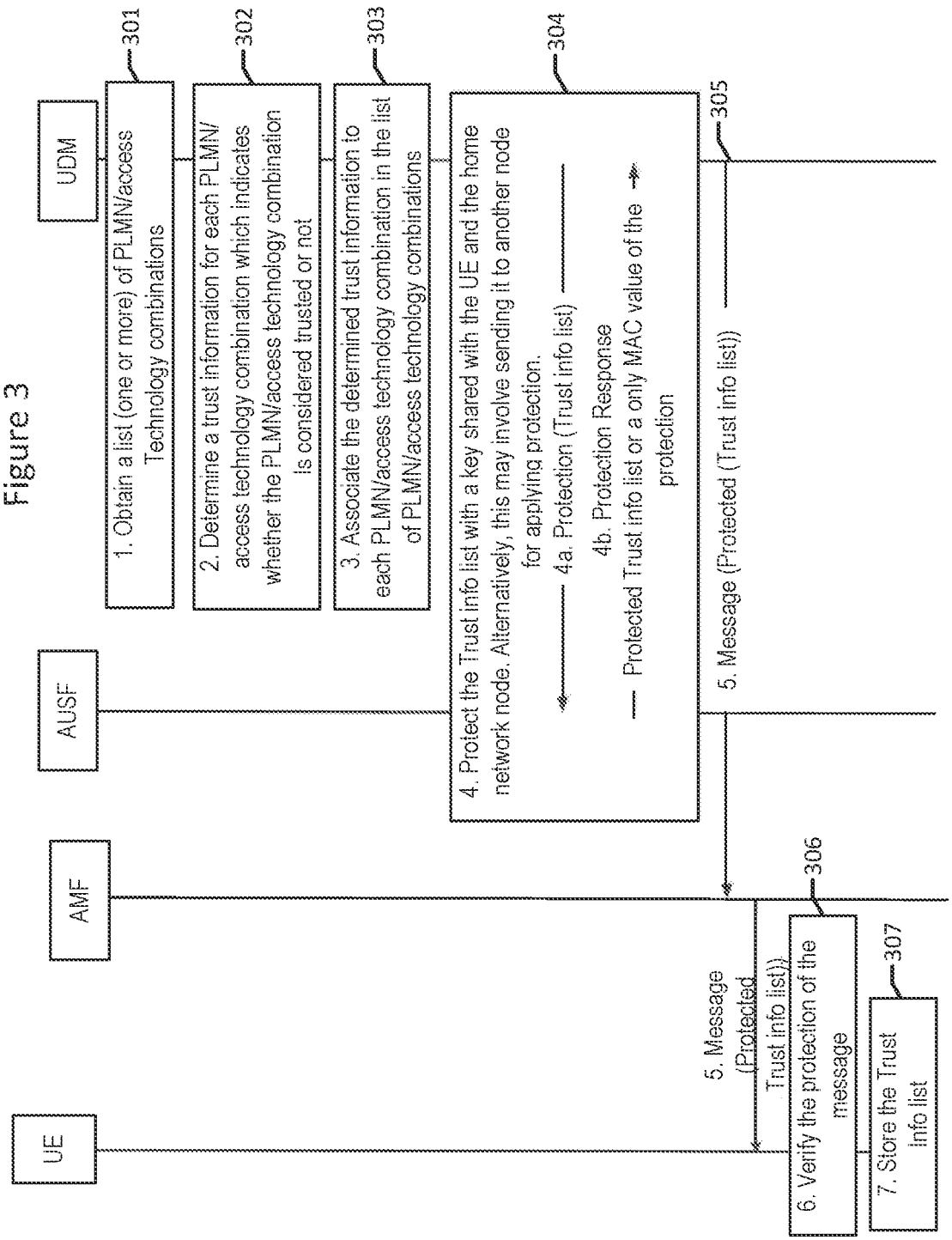
FIG. 3 is a signaling diagram illustrating a procedure for dynamically providing trust information to a user equipment (UE) according to some embodiments of inventive concepts.

FIG. 3 is a signaling diagram illustrating an exemplary embodiment for dynamically providing trust information to a UE according to some embodiments of the present disclosure.

Referring to FIG. 3, in some embodiments, the operations of a network equipment 900 (e.g., a UDM/home node (HN)) include:

- obtain (block 301) a list of public land mobile networks (PLMN)/access technology combinations. As used herein, the term "list" refers to any organization of information including, but not limited to, a list, a record, a table, etc.;
- determine (block 302) a trust information for each (or one or more) PLMN/access technology combination which indicates whether a PLMN/access technology combination is considered trusted or not in the sense as defined in clause 4.2 and 4.3 of TS 33.402 v.15.1.0;
- associate (block 303) the determined trust information to each (or one or more) PLMN/access technology combination in the list of PLMN/access technology combinations;
- protect (block 304) the trust information list with a key shared with the UE and the home network node; and
- send (block 305) the protected trust information list to the UE.

Still referring to FIG. 3, in some embodiments, the operations in a UE 800 include:

- receive (block 306) the protected trust information list;
- check (block 307) the protection of the trust information list; and
- in case of successful protection, check and/or store (block 308) the received trust information list.

In some embodiments, there may be several ways to identify a non-3GPP access network. In some embodiments, the non-3GPP access network may be identified by PLMN/access technology combination, PLMN/access network identity combination, or by all of those, e.g. PLMN/access technology/access network identity. Other combinations are also possible.

In some embodiments, the protecting the trust information with a key shared with the UE and the home network node may include sending the list for protection to another node. Protection may include integrity, confidentiality or replay protection or a combination of those. The key may be the Kausf or a key derived from Kausf. Kausf is the key which results from running primary authentication.

In another embodiment, the key may be a key shared with the UE and visited/serving network, such as Kausf or a key derived from Kausf. In this case the trust information list is sent from the visited/serving network.

In some embodiments, the trust information may be sent to a universal subscriber identity module, USIM, protected by key material shared by a network equipment and the USIM. For example, by using a secure packet mechanism as defined in TS 31.115 v.15.0.0. This embodiment is not shown in the Figures.

In some embodiments, the key results from an authentication procedure performed between communication device 800 and network equipment in the communication network. The network equipment can be the UDM/HN illustrated in FIG. 3 or another network node as described above. The network equipment that determines the trust information (determining) and indicates (indicating) to the communication device whether the one or more access networks is trusted for a current session or a later session may not be the same equipment that performs the authentication. For example, and without limitation, the network equipment performing the determining and indicating can be a UDM and an AUSF can perform the authentication; or the network equipment performing the determining and the indicating can be an AMF and an AUSF may perform the authentication, etc.

In some embodiments, the received trust information list can be used to determine if a non-3GPP access network is trusted or not.

In some embodiments, the operations of network equipment 900 and communication device 800 are applied using some procedures in 3GPP TS 33.501 v16.0.0, i.e. Steering of Roaming and UE Parameter Update procedure. The following clause numbering relates to the numbering from 3GPP TS 33.501 v16.0.0.

Figure 4:
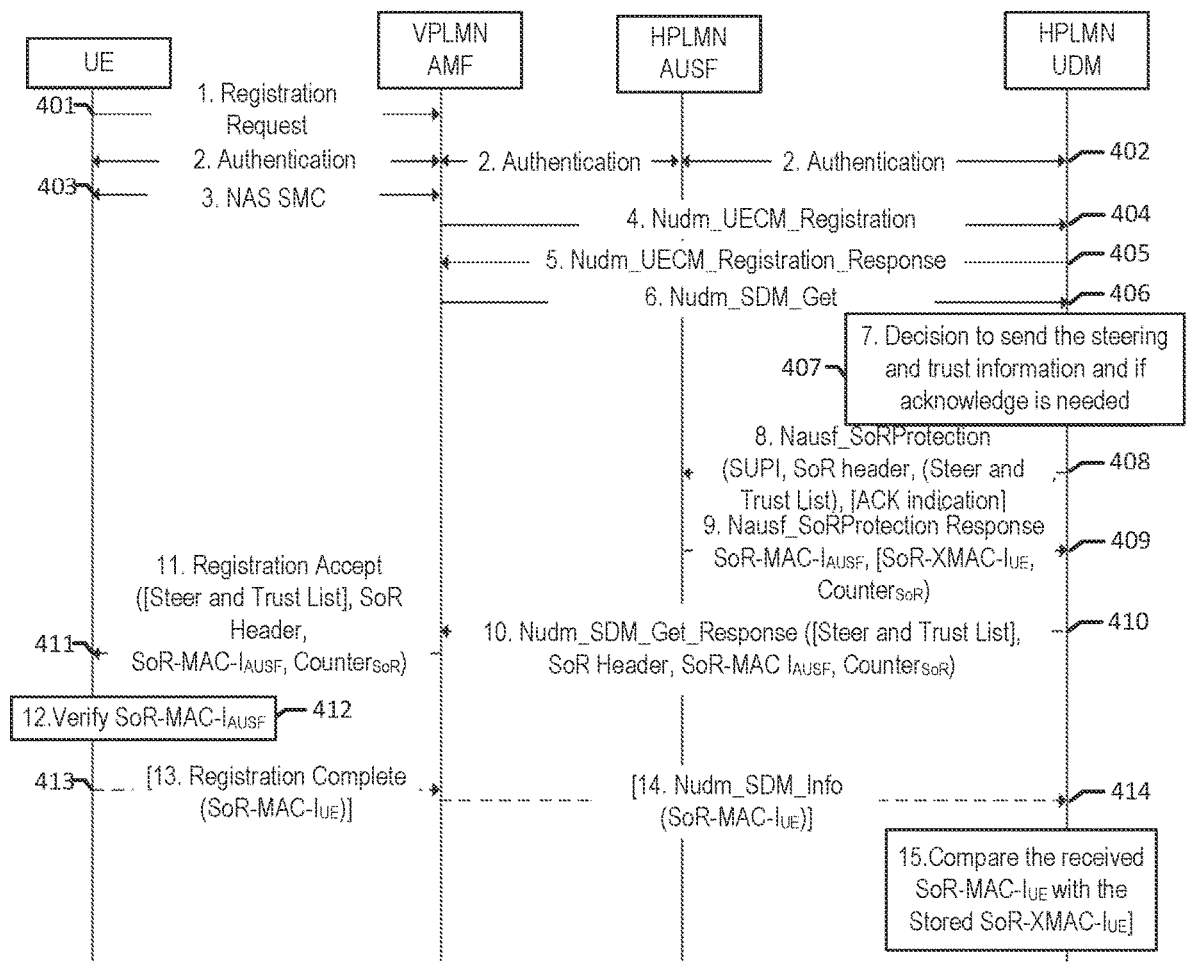
FIG. 4 is a signaling diagram illustrating the security procedure for sending trust information to UE in the case when the UE registers with visited public land mobile network (VPLMN) access and mobility management function (AMF) according to some embodiments of inventive concepts.
Figure 6:
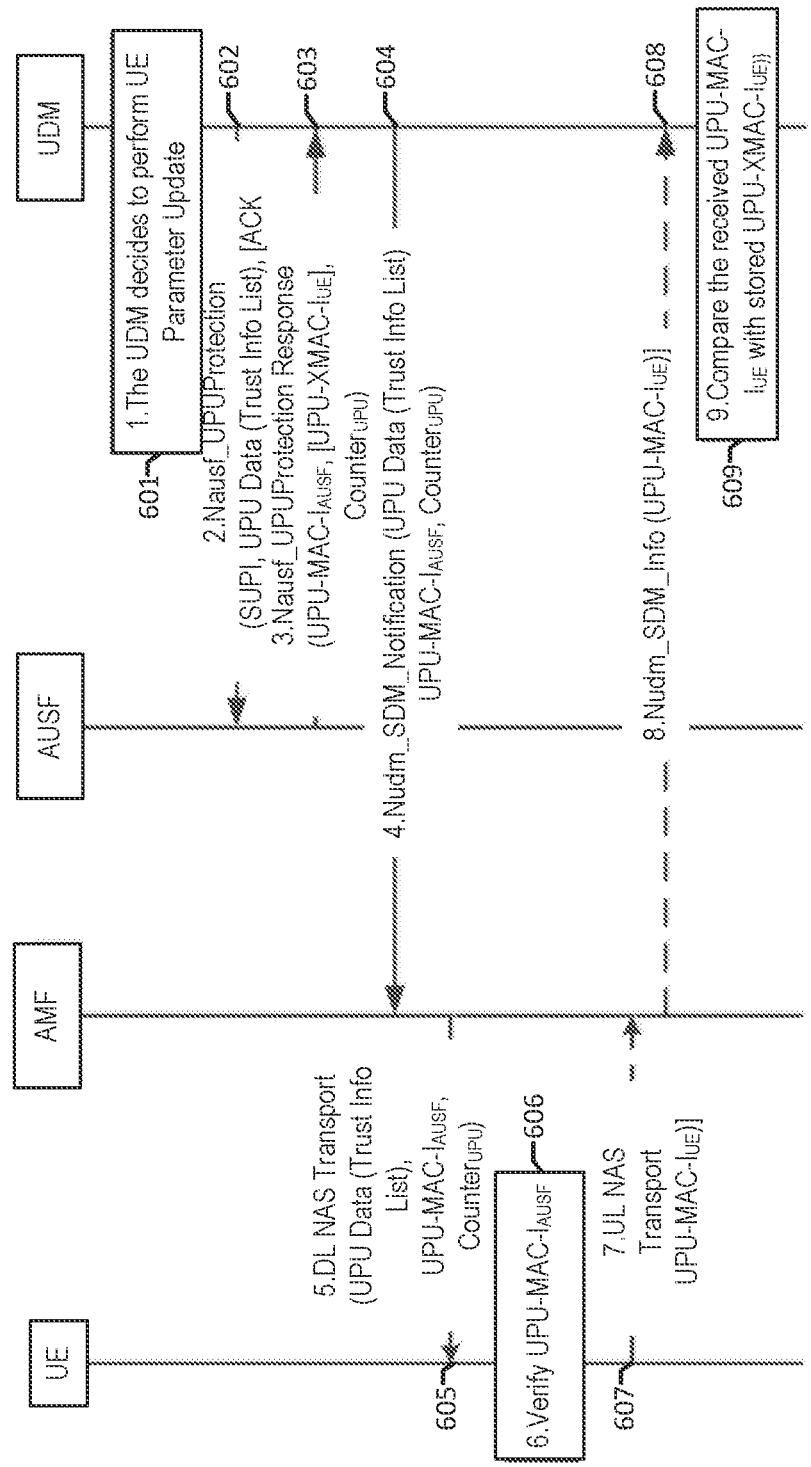
FIG. 6 is a signaling diagram illustrating security procedure for the UE parameters update according to some embodiments of inventive concepts.

An exemplary procedure for sending trust information to UE during steering of UE in VPLMN during registration is discussed below:

FIG. 4 is based on a signaling diagram from FIG. 6.14.2.1 of TS 33.501 v.16.0.0 for providing list of preferred PLMN/access technology combinations, with added portions illustrating new aspects in accordance with various embodiments of inventive concepts for sending trust information to UE in the case where the UE registers with VPLMN AMF.

The following is an exemplary embodiment showing how the embodiment can be applied to the procedure illustrated in FIG. 4. Turning to FIG. 4, operations the network equipment processing circuitry 903 perform and other network equipment perform are illustrated:

1) The UE initiates (block 401) registration by sending Registration Request message to the VPLMN AMF.
2-3) The VPLMN AMF executes the registration procedure as defined in sub-clause 4.2.2.2.2 of 3GPP TS 23.502 v.16.2.0. As part of the registration procedure, the VPLMN AMF executes (block 402) primary authentication of the UE and then initiates (block 403) the non-access stratum (NAS) security mode command (SMC) procedure, after the authentication is successful.
4-5) The VPLMN AMF invokes (block 404) the Nudm_UECM_Registration message to the UDM and registers (block 405) access with the UDM as per step 14a in sub-clause 4.2.2.2.2 of 3GPP TS 23.502 v.16.2.0.
6) The VPLMN AMF invokes (block 406) Nudm_SDM_Get service operation message to the UDM to get amongst other information the Access and Mobility Subscription data for the UE (see step 14b in sub-clause 4.2.2.2.2 of 3GPP TS 23.502 v.16.2.0).
7) The UDM decides (407) to send the Trust Information with Steering Information, and obtains the Steering Information list as described in TS 23.122 v.16.3.0. The UDM associates a Trust Information to each PLMN/access technology combination. This Trust Information indicates whether a PLMN/access technology combination is considered trusted. The Steering Information List with associated Trust Information is hereafter called Steering and Trust Information list.
8-9) The UDM shall (block 408) invoke Nausf_SoRProtection service operation message to the AUSF to get SoR-MAC-IAUSF and CounterSoR as specified in sub-clause 14.1.3 of TS 33.501 v.16.0.0. If the HPLMN decided that the UE is to acknowledge the successful security check of the received Steering Information List, then the UDM shall set the corresponding indication in the SoR header (see TS 24.501 v.16.2.0) and include (block 409) the ACK Indication in the Nausf_SoRProtection service operation message to signal that it also needs the expected SoR-XMAC-IUE, as specified in sub-clause 14.1.3 of TS 33.501 v.16.0.0. The details of the CounterSoR is specified in sub-clause 6.14.2.3 of TS 33.501 v.16.0.0. In case the Steering Information List is not available or HPLMN determines that no steering of the UE is required, then the List indication value in [sic] the SoR header shall be set to null and list shall not be included. The inclusion of a list of preferred PLMN/access technology combinations with associated Trust Information_(if provided) and the SoR header in the calculation of SoR-MAC-IAUSF allows the UE to verify that the Steering Information List received is not tampered with or removed by the VPLMN and if the UDM requested an acknowledgement. The expected SoR-XMAC-IUE allows the UDM to verify that the UE received the Steering and Trust Information List.

10) The UDM responds (block 410) to the Nudm_SDM_Get service operation to the VPLMN AMF, which shall include the SoR header, Steering and Trust Information List, SoR-MAC-IAUSF and CounterSoR within the Access and Mobility Subscription data. If the UDM requests an acknowledgement, it shall temporarily store the expected SoR-XMAC-IUE.
11) The VPLMN AMF shall include (block 411) the Steering and Trust Information List, the SoR-MAC-IAUSF, CounterSoR and the SoR header to the UE in the Registration Accept message;
12) On receiving the Registration Accept message, if the USIM is configured with the indication that the UE shall receive the Steering and Trust Information List, then the UE shall calculate the SoR-MAC-IAUSF in the same way as the AUSF (as specified in Annex A.17 of TS 33.501 v.16.0.0) on the received Steering and Trust information, the CounterSoR and the SoR header and verifies (block 412) whether it matches the SoR-MAC-IAUSF value received in the Registration Accept message. Based on the SoR-MAC-IAUSF verification outcome, the behavior [sic] of the UE is specified in TS 23.122 v.16.3.0.
13) If the UDM has requested an acknowledgement from the UE and the UE verified that the Steering and Trust Information List has been provided by the HPLMN in step 11, then the UE shall send (block 413) the Registration Complete message to the serving AMF. The UE shall generate the SoR-MAC-IUE as specified in Annex A.18 of TS 33.501 v.16.0.0 and includes the generated SoR-MAC-IUE in a transparent container in the Registration Complete message.
14) The AMF sends (block 414) a Nudm_SDM_Info request message to the UDM. If a transparent container with the SoR-MAC-IUE was received in the Registration Complete message, the AMF shall include the transparent container in the Nudm_SDM_Info request message.
15) If the HPLMN indicated that the UE is to acknowledge the successful security check of the received Steering and Trust Information List in step 10, then the UDM shall compare (block 415) the received SoR-MAC-IUE with the expected SoR-XMAC-IUE that the UDM stored temporarily in step 10.

In some embodiments, the trust information may indicate whether a PLMN/access technology combination is trusted or not. In another embodiment the trust information may indicate whether a PLMN/access technology combination is trusted, and it is associated to only such PLMN/access technology combinations.

Some embodiments discussed below show how the embodiments may be applied to some procedures in TS 33.501 v.16.0.0, i.e. procedure for steering of UE in VPLMN after registration. The clause numbering relates to the numbering from section 6.14.2.2 of TS 33.501 v.16.0.0.

Figure 5:
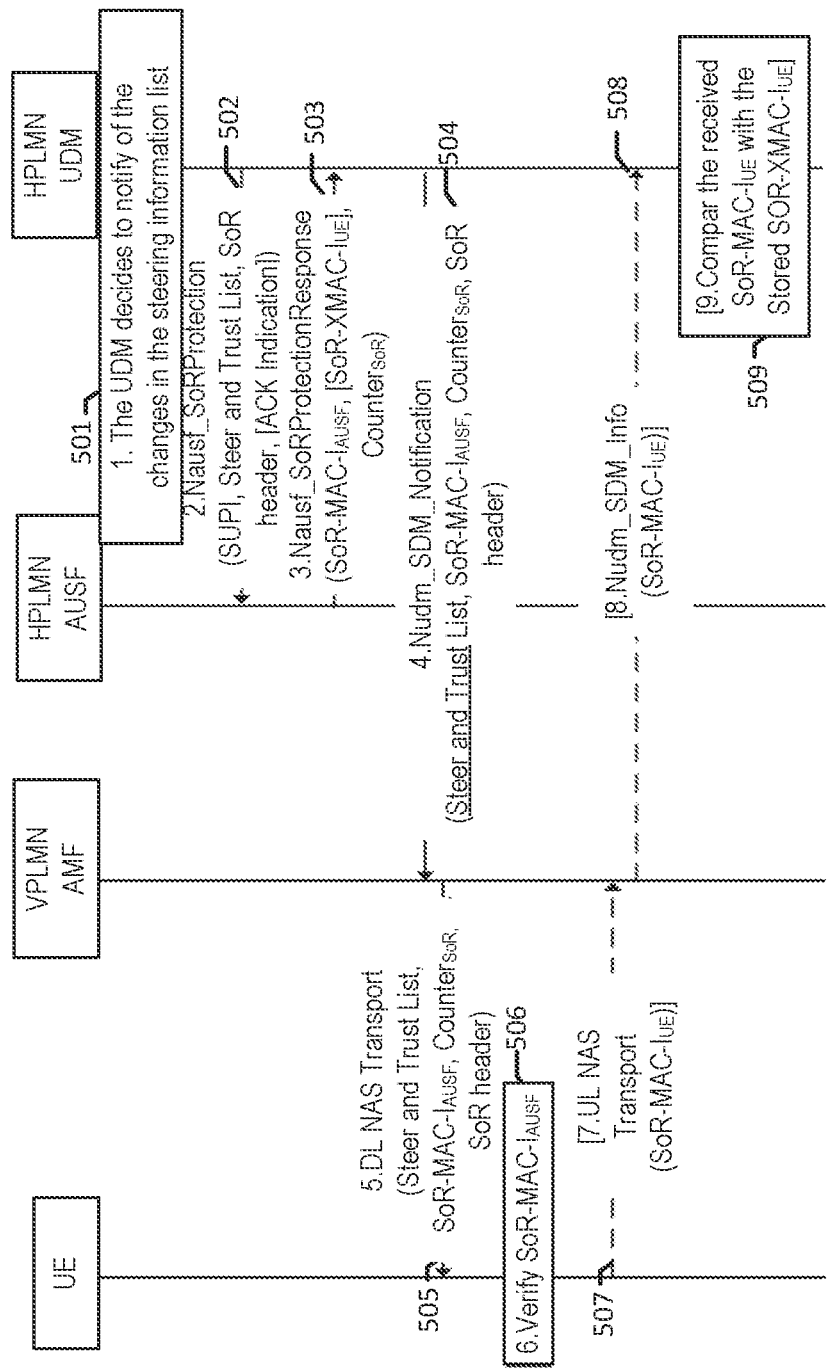
FIG. 5 is a signaling diagram illustrating security procedure for the steering of UE in VPLMN after registration according to some embodiments of inventive concepts.

An exemplary procedure sending trust information to a UE during steering of the UE in VPLMN after registration is discussed below:

FIG. 5 is based on a signaling diagram from 6.14.2.2 of TS 33.501 v.16.0.0 illustrating a procedure for steering of a UE in VPLMN after registration, with added portions of FIG. 5 illustrating new aspects added to FIG. 6.14.2.2-1 of TS 33.501 v.16.0.0 in accordance with various embodiments of inventive concepts for sending trust information to a UE during steering of the UE in VPLMN after registration.

The following is an exemplary embodiment showing how the embodiment may be applied to the procedure illustrated in FIG. 5. Turning to FIG. 5, operations the network equipment processing circuitry 903 perform and other network equipment perform are illustrated:

1) The UDM associates a Trust Information to each PLMN/access technology combination. This Trust Information indicates whether a PLMN/access technology combination is considered trusted. The Steering Information List with associated Trust Information is hereafter called Steering and Trust Information list. The UDM decides (block 501) to notify the UE of the changes to the Steering and Trust Information List by the means of invoking Nudm_SDM_Notification service operation.

2-3) The UDM shall invoke (block 502) Nausf_SoRProtection service operation message by including the SoR header and Steering and Trust Information List to the AUSF to get SoR-MAC-IAUSF and CounterSoR as specified in sub-clause 14.1.3 of TS 33.501 v.16.0.0. If the HPLMN decided (block 503) that the UE is to acknowledge the successful security check of the received Steering and Trust Information List, then the UDM shall set the corresponding indication in the SoR header (see TS 24.501 v.16.2.0) and include the ACK Indication in the Nausf_SoRProtection service operation message to signal that it also needs the expected SoR-XMAC-IUE, as specified in sub-clause 14.1.3 of TS 33.501 v.16.0.0.

The details of the CounterSoR is specified in sub-clause 6.14.2.3 of TS 33.501 v.16.0.0. The inclusion of Steering and Trust Information List and the acknowledge indication in the calculation of SoR-MAC-IAUSF allows the UE to verify that the Steering and Trust Information List received is not tampered with or removed by the VPLMN and if the UDM requested an acknowledgement. The inclusion of these information in the calculation of the expected SoR-XMAC-IUE allows the UDM to verify that the UE received the Steering and Trust Information.

4) The UDM shall invoke (block 504) Nudm_SDM_Notification service operation, which contains the list of preferred PLMN/access technology combinations with associated Trust Information, SoR-MAC-IAUSF, CounterSoR within the Access and Mobility Subscription data and the SoR header. If the UDM requests an acknowledgement, it shall temporarily store the expected SoR-XMAC-IUE.

5) Upon receiving the Nudm_SDM_Notification message, the AMF shall send (block 505) a DL NAS Transport message to the served UE. The AMF shall include in the DL NAS Transport message the transparent container received from the UDM.

6) On receiving the DL NAS Transport message, the UE shall calculate the SoR-MAC-IAUSF in the same way as the AUSF (as specified in Annex A.17 of TS 33.501 v.16.0.0) on the received Steering and Trust information, the CounterSoR and the SoR header and verifies (block 506) whether it matches the SoR-MAC-IAUSF value received in the DL NAS Transport message.

7) If the UDM has requested an acknowledgement from the UE and the UE verified that the Steering and Trust Information List has been provided by the HPLMN, then the UE shall send (block 507) the UL NAS Transport message to the serving AMF. The UE shall generate the SoR-MAC-IUE as specified in Annex A.18 and includes the generated SoR-MAC-IUE in a transparent container in the UL NAS Transport message.

8) The AMF shall send (block 508) a Nudm_SDM_Info request message to the UDM. If a transparent container with the SoR-MAC-IUE was received in the UL NAS Transport message, the AMF shall include the transparent container in the Nudm_SDM_Info request message.

9) If the HPLMN indicated that the UE is to acknowledge the successful security check of the received Steering and Trust Information List, then the UDM shall compare (block 509) the received SoR-MAC-IUE with the expected SoR-XMAC-IUE that the UDM stored temporarily in step 4.

Various embodiments for sending trust information to the UE via UE parameters update via UDM control plane procedure security mechanism are discussed below:

Some embodiments discussed below show how the embodiments may be applied to some procedures in TS 33.501 v.16.0.0, i.e. UE parameters update via UDM control plane procedure security mechanism. The clause numbering relates to the numbering from section 6.15 of TS 33.501 v.16.0.0.

6.15.1 General

This clause describes the security functions necessary to update the UE parameters (i.e. Trust Information list) using the UDM control plane procedure specified in TS 23.502 v.16.2.0. The security functions are described in the context of the functions supporting the delivery of UE Parameters Update Data (i.e. Trust Information list) from the UDM to the UE after the UE has successfully registered to the 5G network.

If the control plane procedure for UE parameters update is supported by the UDM, the AUSF shall store the KAUSF after the completion of the primary authentication.

The content of UE Parameters Update Data (i.e. Trust Information list) and the conditions for sending it to the UE as well as how it is handled at the UE are specified in TS 24.501 v.16.2.0.

NOTE: The home network relies on the serving network to deliver the UE parameters update.

6.15.2 Security Mechanisms 6.15.2.1 Procedure for UE Parameters Update

The UDM may decide to perform UE parameters update any time after the UE has been successfully authenticated and registered to the 5G system.

FIG. 6 is based on a signaling diagram from 6.15.2.1 illustrating security procedure for the UE parameters update. FIG. 6 illustrate new aspects added to FIG. 6.15.2.1-1 of TS 33.501 v.16.0.0 in accordance with some embodiments of inventive concepts.

The following is an exemplary embodiment showing how the embodiment may be applied to the procedure illustrated in FIG. 6. Turning to FIG. 6, operations the network equipment processing circuitry 903 perform and other network equipment perform are illustrated:

0) The UDM obtains a list of preferred PLMN/access technology combinations. The UDM associates a Trust Information to each PLMN/access technology combination. This Trust Information indicates whether a PLMN/access technology combination is considered trusted. The list with associated Trust Information is hereafter called Trust Information list.
1) The UDM decides (block 601) to perform the UE Parameters Update (UPU) using the control plane procedure while the UE is registered to the 5G system. If the final consumer of any of the UE parameters to be updated (e.g., the updated Routing ID Data) is the USIM, the UDM shall protect these parameters using a secured packet mechanism (see 3GPP TS 31.115 v.15.0.0) to update the parameters stored on the USIM. The UDM shall then prepare the UE Parameters Update Data (UPU Data) by including the parameters protected by the secured packet, if any, as well as any UE parameters for which final consumer is the ME (see TS 24.501 v.16.2.0). In this case the UPU Data includes the Trust Information list.
2-3) The UDM shall invoke (block 602) Nausf_UPUProtection service operation message by including the UPU Data (i.e. Trust Information list) to the AUSF to get (block 603) UPU-MAC-IAUSF and CounterUPU as specified in sub-clause 14.1.4 of TS 33.501 v.16.0.0. If the UDM decided that the UE is to acknowledge the successful security check of the received UE Parameters Update Data, then the UDM shall set the corresponding indication in the UE Parameters Update Data (i.e. Trust Information list) (see TS 24.501 v.16.2.0) and include the ACK Indication in the Nausf_UPUProtection service operation message to signal that it also needs the expected UPU-XMAC-IUE, as specified in sub-clause 14.1.4 of TS 33.501 v.16.0.0.

The details of the CounterUPU is specified in sub-clause 6.15.2.2 of TS 33.501 v.16.0.0. The inclusion of UE Parameters Update Data (i.e. Trust Information list) in the calculation of UPU-MAC-IAUSF allows the UE to verify that it has not been tampered by any intermediary. The expected UPU-XMAC-IUE allows the UDM to verify that the UE received the UE Parameters Update Data correctly.

4) The UDM shall invoke (block 604) Nudm_SDM_Notification service operation, which contains UE Parameters Update Data (i.e. Trust Information list), UPU-MAC-IAUSF, CounterUPU within the Access and Mobility Subscription data. If the UDM requests an acknowledgement, it shall temporarily store the expected UPU-XMAC-IUE.
5) Upon receiving the Nudm_SDM_Notification message, the AMF shall send (block 605) a DL NAS Transport message to the served UE. The AMF shall include in the DL NAS Transport message the transparent container received from the UDM.
6) On receiving the DL NAS Transport message, the UE shall calculate the UPU-MAC-IAUSF in the same way as the AUSF (as specified in Annex A.19 of TS 33.501 v.16.0.0) on the received UE Parameters Update Data (i.e. Trust Information list) and the CounterUPU and verify (block 606) whether it matches the UPU-MAC-IAUSF value received in the DL NAS Transport message. If the verification of UPU-MAC-IAUSF is successful and the UPU Data contains any parameters that is protected by secured packet (see 3GPP TS 31.115 v.15.0.0), the ME shall forward the secured packet to the USIM using procedures in 3GPP TS 31.111 v.15.0.0. If the verification of UPU-MAC-IAUSF is successful and the UPU Data contains any parameters (i.e. Trust Information list) that is not protected by secure packet, the ME shall update its stored parameters with the received parameters in UDM Updata Data.
7) If the UDM has requested an acknowledgement from the UE and the UE has successfully verified and updated the UE Parameters Update Data (i.e. Trust Information list) provided by the UDM, then the UE shall send (block 607) the UL NAS Transport message to the serving AMF. The UE shall generate the UPU-MAC-IUE as specified in Annex A.20 of TS 33.501 v.16.0.0 and include the generated UPU-MAC-IUE in a transparent container in the UL NAS Transport message.
8) If a transparent container with the UPU-MAC-IUE was received in the UL NAS Transport message, the AMF shall send (block 608) a Nudm_SDM_Info request message with the transparent container to the UDM.
9) If the UDM indicated that the UE is to acknowledge the successful security check of the received UE Parameters Update Data, then the UDM shall compare (block 609) the received UPU-MAC-IUE with the expected UPU-XMAC-IUE that the UDM stored temporarily in step 4.

Referring to the above operation 0, in some embodiments there is more granular access network information in addition to or instead of the access technology such as access network identity. An example is service set identifier (SSID) or basic service set identifier (BSSID) of WLAN.

Also referring to the above operation 0, in another embodiment, PLMN information is not sent but only access technology information.

Various embodiments for sending trust information to the UE in relation to primary authentication are discussed below:

5G Authentication and Key Agreement (AKA) authentication mechanism does not support sending a trust indication to the UE within the 5G AKA messages (as EAP-AKA' method does as specified in TS 33.402 v.15.1.0, clause 6.1). Therefore, in another embodiment the Trust information list (as described above) is sent after the primary authentication and it may be especially useful if sent after 5G AKA authentication. Clause numbering is from TS 33.501 v.16.0.0.

Some embodiments discussed below show how the embodiments may be applied to some procedures in TS 33.501 v.16.0.0, i.e. linking authentication confirmation to Nudm_UECM_Registration procedure from AMF in accordance with some embodiments. The clause numbering relates to the numbering from section 6.15 of TS 33.501 v.16.0.0.

6.1.4.1a Linking Authentication Confirmation to Nudm_UECM_Registration Procedure from AMF The information sent from the AUSF to the UDM that a successful or unsuccessful authentication of a subscriber has occurred, shall be used to link authentication confirmation to subsequent procedures. The AUSF shall send the Nudm_UEAuthentication_ResultConfirmation service operation for this purpose as shown in FIG. 6.1.4.1a-1 of TS 33.501 v.16.0.0.

Figure 7:
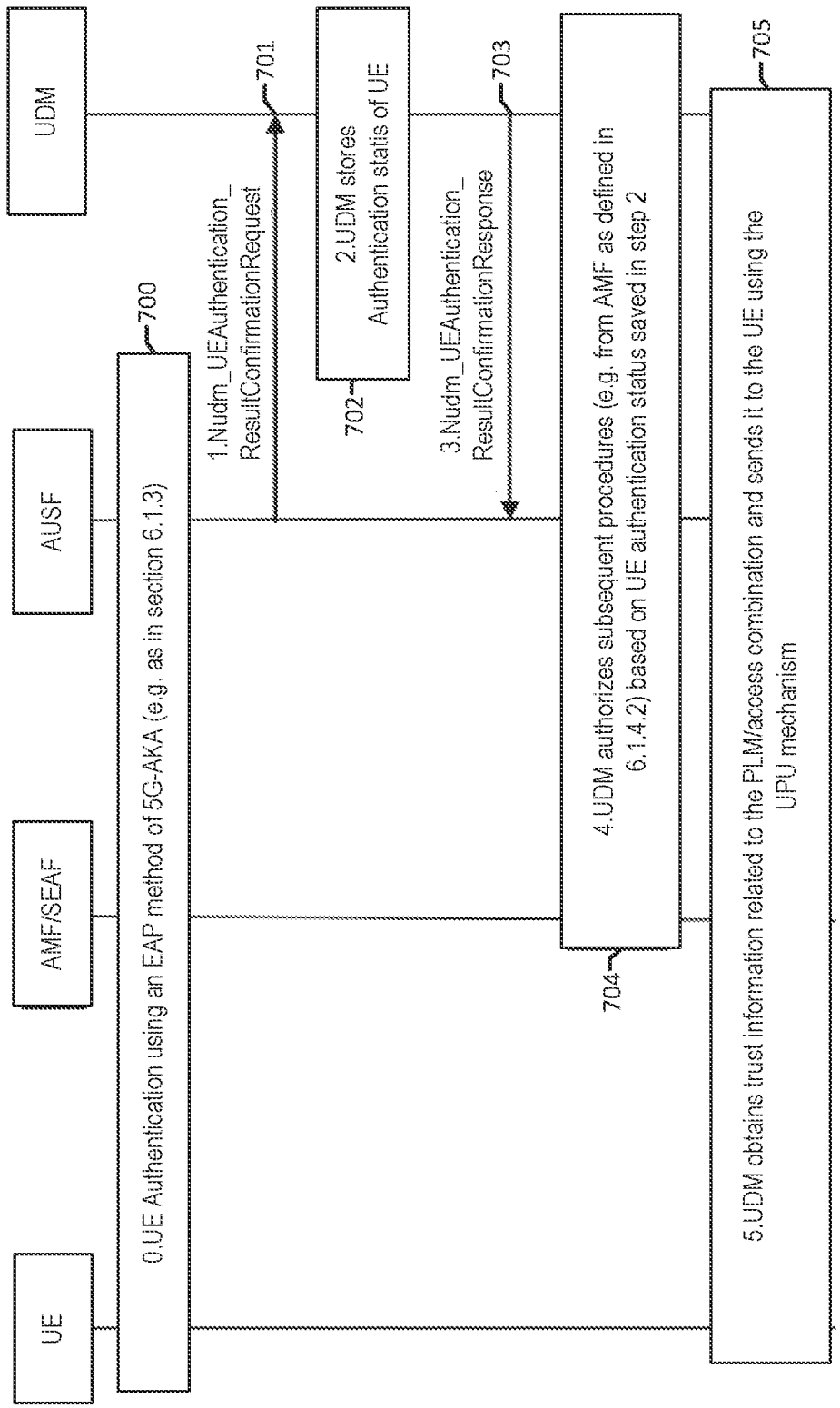
FIG. 7 is a signaling diagram illustrating procedure for linking increased home control to subsequent procedures according to some embodiments of inventive concepts.

FIG. 7 is based on a signaling diagram from 6.1.4.1a illustrating a procedure for linking increased home control to subsequent procedures. FIG. 7 illustrate new aspects added to FIG. 6.1.4.1a-1 of TS 33.501 v.16.0.0 in accordance with some embodiments of inventive concepts.

The following is an exemplary embodiment showing how the embodiment can be applied to the procedure illustrated in FIG. 7. Turning to FIG. 7, operations the network equipment processing circuitry 903 perform and other network equipment perform are illustrated:

1. The AUSF shall inform (block 701) UDM about the result and time of an authentication procedure with a UE using a Nudm_UEAuthentication_ResultConfirmation Request. This shall include the SUPI, a timestamp of the authentication, the authentication type (e.g. EAP method or 5G-AKA), and the serving network name.

NOTE: It may be sufficient for the purposes of fraud prevention to send only information about successful authentications, but this is up to operator policy.

2. The UDM shall store (block 702) the authentication status of the UE (SUPI, authentication result, timestamp, and the serving network name)
3. UDM shall reply (block 703) to AUSF with a Nudm_UEAuthentication_ResultConfirmation Response.
4. Upon reception of subsequent UE related procedures (e.g. Nudm_UECM_Registration_Request from AMF) UDM may apply (block 704) actions according to home operator's policy to detect and achieve protection against certain types of fraud (e.g. as proposed in section 6.1.4.2 of TS 33.501 v.16.0.0).
5. The UDM obtains (block 705) the Trust Information related to the PLMN/access technology combination where authentication was performed and associates the trust info to the PLMN/access technology combination. This Trust Information indicates whether a PLMN/access technology combination is considered trusted.
6. The UDM protects the Trust info and sends it to the UE using the UPU mechanism as shown in portions of the present disclosure relating to FIG. 6. Additional embodiments of the present disclosure are discussed below:

In some embodiments, there are multiple trust indications, one from VPLMN/SPLMN and another from home public land mobile network (HPLMN).

In some embodiments, standardized or default behavior of UE is that VPLMN/SPLMN's trust indication overrides HPLMN's trust indication.

In some embodiments, standardized or default behavior of UE is that HPLMN's trust indication overrides VPLMN/SPLMN's trust indication.

In some embodiments, the HPLMN indicates to the UE to obey VPLMN/SPLMN's trust indication.

In some embodiments, the decision about trust (in VPLMN/SPLMN) is based on properties of the access node via which the UE is currently communicating.

In some embodiments, the decision about trust (in VPLMN/SPLMN) is based on properties of the access node via which the UE wants to communicate later.

In some embodiments, properties of the access node are:
type of access node (e.g., WLAN, Bluetooth, Zigbee, trusted non-3GPP access point (TNAP), Laser, optical fiber, copper cable, etc.);
type of radio access technology (e.g., narrowband internet of things (NB-IOT), long term evolution for machines (LTE-M), new radio (NR), etc.);
location of the access node (e.g., cinema hall, latitude, longitude, altitude, behind concrete wall, etc.);
software/hardware vendor of the access node;
software/hardware version of the access node;
interfaces and security protocols supported by the access node; or
identifier of access node (e.g., media access control (MAC) address, public name, BSSID, SSID, device identifier, line number, etc.).

In some embodiments, properties of the access node are determined based on information obtained from VPLMN/serving public land mobile network (SPLMN) or from HPLMN or from external source (e.g., 3rd party file).

In some embodiments, the decision is based on other factors such as:
date/time at which the access node is being used;
policy based on other factors (e.g., business agreement, etc.);
type of authentication method that is or will be used;
subscription profile (e.g., certain international mobile subscriber identifier (IMSI)/network access identifier (NAI), payment method, preference, etc.); or
device properties (e.g., vendor identifier, model number, international mobile equipment identity (IMEI), etc.).

In some embodiments, the decision is based on indication from UE (e.g., Boolean Flag, preconfigured or based on human users input, or based on local policy at UE).

In some embodiments, the trust indication from VPLMN/SPLMN is based on decision performed by the VPLMN/SPLMN or decision performed by the HPLMN.

In some embodiments, the trust indication from VPLMN/SPLMN is sent to UE in a secure message. The secure message can be a non-access stratum (NAS) message. The secure message may be a message from HPLMN to UE (e.g., UPU/SoR message) with is enriched by VPLMN (e.g., by adding a new field and a security token like message authentication code).

Figure 8:
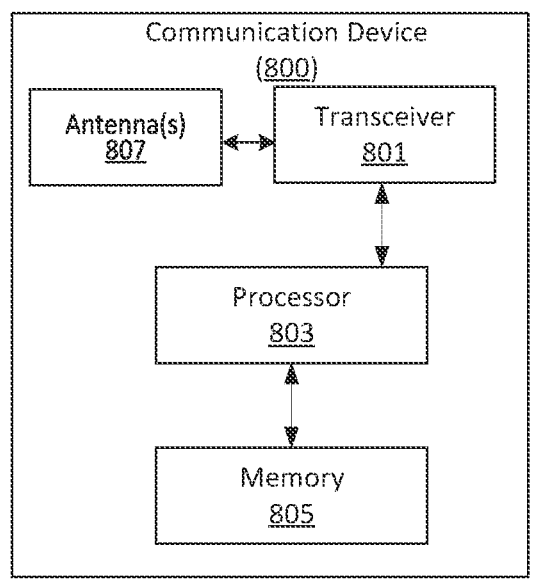
FIG. 8 is a block diagram illustrating a communication device according to some embodiments of inventive concepts.

FIG. 8 is a block diagram illustrating elements of a communication device 800 (also referred to as a user equipment (UE), a mobile terminal, a mobile communication terminal, a wireless communication device, a wireless terminal, a wireless communication terminal, a user equipment node/terminal/device, etc.) configured to provide wireless communication according to embodiments of inventive concepts. (Communication device 800 may be provided, for example, as discussed below with respect to wireless device QQ110 of FIG. 14.) As shown, communication may include an antenna 807 (e.g., corresponding to antenna QQ111 of FIG. 14), and transceiver circuitry 801 (also referred to as a transceiver, e.g., corresponding to interface QQ114 of FIG. 14) including a transmitter and a receiver configured to provide uplink (UL) and downlink (DL) radio communications with a base station(s) (e.g., corresponding to network node QQ160 of FIG. 14) of a radio access network. Communication device 800 may also include processing circuitry 803 (also referred to as a processor, e.g., corresponding to processing circuitry QQ120 of FIG. 14) coupled to the transceiver circuitry, and memory circuitry 805 (also referred to as memory, e.g., corresponding to device readable medium QQ130 of FIG. 14) coupled to the processing circuitry. The memory circuitry 805 may include computer readable program code that when executed by the processing circuitry 803 causes the processing circuitry to perform operations according to embodiments disclosed herein. According to other embodiments, processing circuitry 803 may be defined to include memory so that separate memory circuitry is not required. Communication device 800 may also include an interface (such as a user interface) coupled with processing circuitry 803, and/or communication device may be incorporated in a vehicle.

As discussed herein, operations of a communication device may be performed by processing circuitry 803 and/or transceiver circuitry 801. For example, processing circuitry 803 may control transceiver circuitry 801 to transmit communications through transceiver circuitry 801 over a radio interface to a radio access network node (also referred to as a base station) or network equipment and/or to receive communications through transceiver circuitry 801 from a RAN node or network equipment over a radio interface. Moreover, modules may be stored in memory circuitry 805, and these modules may provide instructions so that when instructions of a module are executed by processing circuitry 803, processing circuitry 803 performs respective operations (e.g., operations discussed below with respect to Example Embodiments relating to communication devices).

Figure 9:
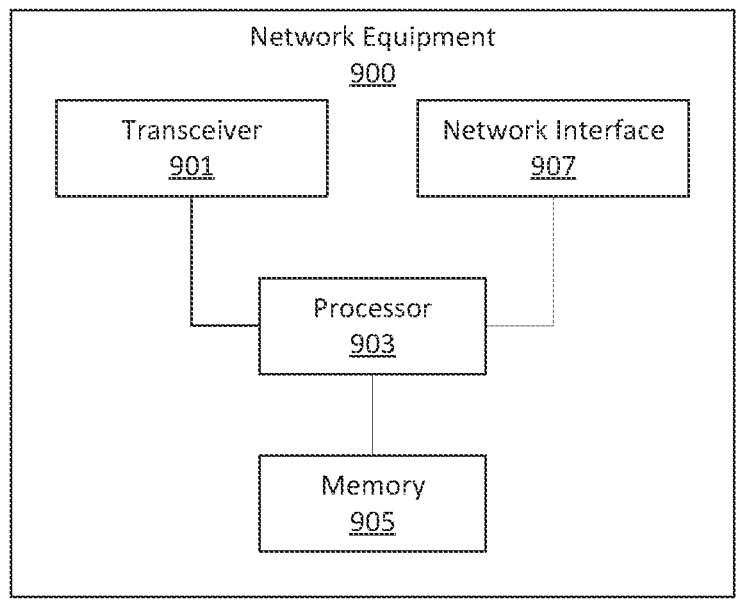
FIG. 9 is a block diagram illustrating a network equipment (e.g., a unified data management (UDM), an authentication server function (AUSF), etc.) according to some embodiments of inventive concepts.

FIG. 9 is a block diagram illustrating elements of network equipment 900 (which may be, and also be referred to as a unified data management (UDM), an authentication server function (AUSF) equipment, a security anchor function (SEAF) equipment, an access and mobility management function (AMF) equipment, another network equipment in a home public land mobile network (HPLMN), another network equipment in a visited public land mobile network (VPLMN) etc.) of a communication network (e.g., a radio access network (RAN)) configured to provide cellular communication according to embodiments of inventive concepts. Network equipment 900 may be provided, for example, as discussed below with respect to network node QQ160 of FIG. 14. As shown, the network equipment 900 may include transceiver circuitry 901 (also referred to as a transceiver, e.g., corresponding to portions of interface QQ190 of FIG. 14) including a transmitter and a receiver configured to provide uplink and downlink radio communications with communication devices. The network equipment 900 may include network interface circuitry 907 (also referred to as a network interface, e.g., corresponding to portions of interface QQ190 of FIG. 14) configured to provide communications with other network equipment of the communication network (e.g., of a RAN and/or core network CN). The network equipment 900 may also include a processing circuitry 903 (also referred to as a processor, e.g., corresponding to processing circuitry QQ170) coupled to the transceiver circuitry, and a memory circuitry 905 (also referred to as memory, e.g., corresponding to device readable medium QQ180 of FIG. 14) coupled to the processing circuitry. The memory circuitry 905 may include computer readable program code that when executed by the processing circuitry 903 causes the processing circuitry to perform operations according to embodiments disclosed herein. According to other embodiments, processing circuitry 903 may be defined to include memory so that a separate memory circuitry is not required.

As discussed herein, operations of the network equipment 900 may be performed by processing circuitry 903, network interface 907, and/or transceiver 901. For example, processing circuitry 903 may control transceiver 901 to transmit downlink communications through transceiver 901 over a radio interface to one or more communication devices and/or to receive uplink communications through transceiver 901 from one or more communication devices over a radio interface. Similarly, processing circuitry 903 may control network interface 907 to transmit communications through network interface 907 to one or more other network equipment and/or to receive communications through network interface from one or more other network equipment. Moreover, modules may be stored in memory 905, and these modules may provide instructions so that when instructions of a module are executed by processing circuitry 903, processing circuitry 903 performs respective operations (e.g., operations discussed below with respect to Example Embodiments relating to network equipment).

According to some other embodiments, a network equipment may be implemented as a core network CN node without a transceiver. In such embodiments, transmission to a communication device may be initiated by the network equipment so that transmission to the communication device is provided through a network equipment including a transceiver (e.g., through a base station or RAN node). According to embodiments where the network equipment is a RAN node including a transceiver, initiating transmission may include transmitting through the transceiver.

Now that the operations of various components have been described, operations specific to the network equipment 900 (implemented using the structure of the block diagram of FIG. 9) will now be discussed with reference to the flow charts of FIGS. 10-12 according to some embodiments of inventive concepts. For example, modules may be stored in memory 905 of FIG. 9, and these modules may provide instructions so that when the instructions of a module are executed by respective network equipment processing circuitry 903, processing circuitry 903 performs respective operations of the flow chart. Each of the operations described in FIGS. 10-12 can be combined and/or omitted in any combination with each other, and it is contemplated that all such combinations fall within the spirit and scope of this disclosure.

The block diagram in FIG. 9 illustrates an embodiment of a network equipment (900) which includes a processing circuitry (903) and a memory (905) coupled with the processing circuitry. The memory (905) includes instructions that when executed by the processing circuitry (903) causes the network equipment (900) to perform operations.

Figure 10:
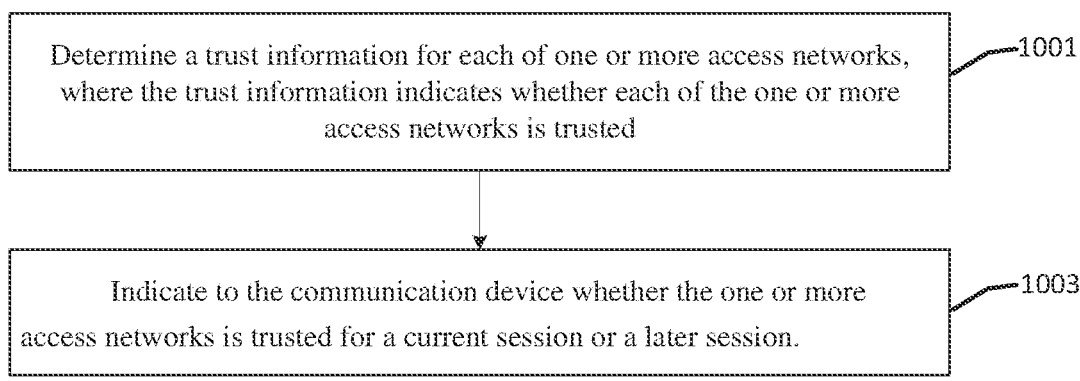
FIGS. 10-12 are flow charts illustrating operations of a network equipment according to some embodiments of inventive concepts.

FIG. 10 is a flow chart illustrating a method performed by a network equipment (900) of a communication network to dynamically provide trust information to a communication device (800). In block 1001, the processing circuitry 903 may determine (1001) a trust information for each of one or more access networks. The trust information indicates whether each of the one or more access networks is trusted. In block 1003, the processing circuitry 903 may indicate (1003) to the communication device (800) whether the one or more access networks is trusted for a current session or a later session.

In some embodiments, the one or more access networks includes a non-3GPP access network or a 3GPP access network. In some embodiments, the non-3GPP access network includes one of: a public land mobile network, PLMN, and an access technology combination; a PLMN, an access technology, and an access network identity combination; a PLMN and an access network identity combination; an access network connected to a PLMN; and a combination of (1) the PLMN and an access technology combination, (2) the PLMN, an access technology, an access network identity combination, (3) the PLMN and an access network identity combination, and/or (4) the access network connected to a PLMN.

In some embodiments, the network equipment (900) is: (1) a unified data management, UDM, equipment, (2) an authentication server function, AUSF, equipment, and/or (3) another network function equipment in a home PLMN, HPLMN.

In some embodiments, the network equipment (900) is: (1) a security anchor function, SEAF, equipment, (2) an access management function, AMF, equipment, and/or (3) another network function equipment in a visited PLMN, VPLMN.

Figure 11:
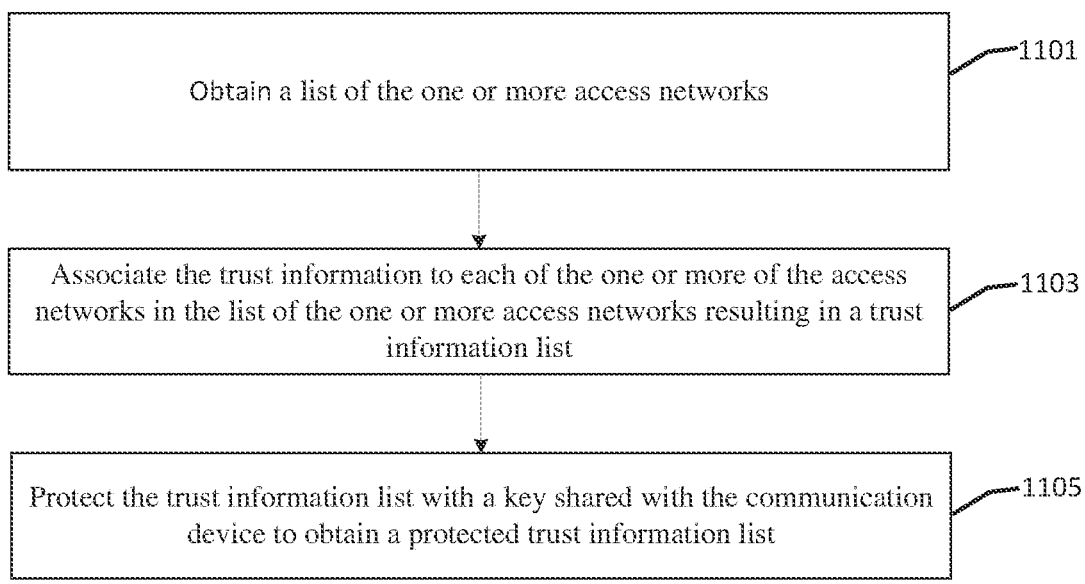

FIG. 11 is a block diagram illustrating further operations of network equipment (900) for determining (1001) the trust information for each of the one or more access networks. In block 1101, the processing circuitry 903 obtains (1101) a list of the one or more access networks. In block 1103, the processing circuitry 903 associates (1103) the trust information to each of the one or more of the access networks in the list of the one or more access networks resulting in a trust information list. In block 1103, the processing circuitry 903 protects (1105) the trust information list with a key shared with the communication device to obtain a protected trust information list.

Referring to block 1003 of FIG. 10, in some embodiments, the indicating (1003) to the communication device (800) whether the one or more access networks are trusted for a current session or a later session includes sending the protected trust information list toward the communication device.

In some embodiments, the key results from an authentication procedure is performed between the communication device (800) and a network equipment in the communication network, and the network equipment is one or more of the network equipment (900) or another network equipment in the communication network. In some embodiments, the authentication procedure is a primary authentication procedure.

In some embodiments, the key is a key shared with the communication device and a home network or a key derived from the key shared with the communication device and the home network. In some embodiments, the network equipment is a visited home network equipment. In some embodiments, the key is $K_{AUSF}$ or a key derived from $K_{AUSF}$. In some embodiments, the key is a key shared between a universal subscriber identity module, USIM, of the communication device and a network equipment. In some embodiments, the key is a key shared with the communication device and a visited network or a key derived from the key shared with the communication device and the visited network, and the node is a visited network node.

Referring to block 1105 of FIG. 11, the method and operations performed by the processor 903 may include transmitting the trust information list to an authentication server function, AUSF, and receiving a protected trust information list from the AUSF or a message authentication code, MAC, value for the protected trust information list.

Still referring to block 1105 of FIG. 11, in some embodiments, the protecting (1105) is one or more of: integrity protection; confidentiality protection; and replay protection.

In some embodiments, the protected trust information list sent toward the communication device is sent during steering of the communication device in a VPLMN during registration.

Figure 12:
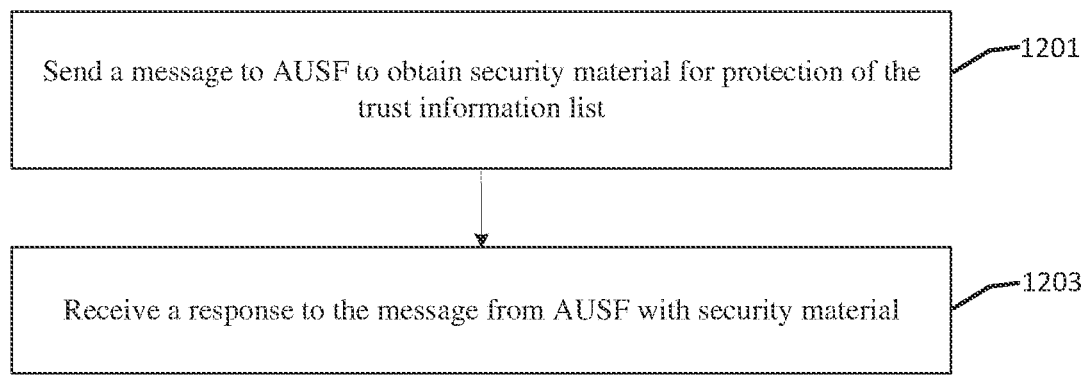

FIG. 12 is a block diagram illustrating additional methods and operations performed by the processor (903) of a network equipment (900) to dynamically provide trust information to a communication device (800). In block 1201, the processing circuitry (903) sends (1201) a message to the AUSF to obtain security material for protection of the trust information list. In block 1203, the processing circuitry (903) receives (1203) a response to the message from the AUSF with the security material.

In some embodiments, the sending the protected trust information list toward the communication device is sent toward the communication device during steering of the communication device in a VPLMN after registration.

In some embodiments, the steering includes Steering of Roaming (SoR).

In some embodiments, the sending the protected trust information list toward the communication device is sent toward the communication device via a parameters update to the communication device during a UDM control plane security procedure.

In some embodiments, the parameters update includes a user equipment parameter update, UPU.

In some embodiments, the sending the protected trust information list toward the communication device is sent toward the communication device after a primary authentication.

In some embodiments, the list of the one or more access networks is obtained where an authentication of the communication device was performed, and the sending the protected trust information list toward the communication device is sent toward the communication device using a user equipment parameter update, UPU, procedure.

In some embodiments, the trust information indicates whether each of the one or more access networks is trusted includes a plurality of trust information indications. Furthermore, the plurality of trust information indications includes a trust information indication from a VPLMN, and a trust information indication from a HPLMN.

In some embodiments, the trust information indication from the VPLMN is based on a decision performed by the VPLMN or the HPLMN.

In some embodiments, the trust information indication from the VPLMN is sent toward the communication device in a secure message.

In some embodiments, the HPLMN indicates to the communication device to obey the trust indication of the VPLMN based on: properties of a first access node via which the communication device (800) is communicating; properties of a second access node via which the communication device (800) will communicate; or an indication from the communication device (800). In some embodiments, the HPLMN indicates to the communication device to obey the trust indication of the VPLMN based on one or more factors including: a date and/or time at which the first access node is used; a policy; a type of authentication method; a subscription profile; or a device property of the first access node and/or of the second access node.

In some embodiments, the first access node and the second access node each have a property including one or more of: a type of the access node; a type of radio access technology; a location of the access node; a software and/or hardware vendor of the access node; a software and/or hardware version of the access node; an interface supported by the access node; a security protocol supported by the access node; or an identifier of the access node. In some embodiments, the property is determined based on information obtained from the VPLMN, the HPLMN, or an external source Referring to the block diagram in FIG. 9, in various embodiments, a network equipment (900) includes a processing circuitry (903) and a memory (905) coupled with the processing circuitry. The memory (905) includes instructions that when executed by the processing circuitry (903) causes the network equipment (900) to perform operations. In some embodiments, a network equipment (900) may be adapted to perform operations including determining (1001) a trust information for each of one or more access networks, and indicating (1003) to the communication device (800) whether the one or more access networks is trusted for a current session or a later session. The trust information may indicate whether each of the one or more access networks is trusted.

Referring still to FIGS. 9 and 10, in various embodiments, a computer program may include program code to be executed by processing circuitry (903) of a network equipment (900). Execution of the program code causes the network equipment (900) to perform operations including determining (1001) a trust information for each of one or more access networks, wherein the trust information indicates whether each of the one or more access networks is trusted, and indicating (1003) to the communication device whether the one or more access networks is trusted for a current session or a later session.

Referring still to FIGS. 9 and 10, in various embodiments, a computer program product may include a non-transitory storage medium including program code to be executed by processing circuitry (903) of a network equipment (900). Execution of the program code may cause the network equipment (900) to perform operations including determining (1001) a trust information for each of one or more access networks, wherein the trust information indicates whether each of the one or more access networks is trusted, and indicating (1003) to the communication device whether the one or more access networks is trusted for a current session or a later session.

Various operations from the flow charts of FIGS. 11 and 12 may be optional with respect to some embodiments of network equipment and related methods. Regarding methods of some example embodiments (set forth below), for example, operations of blocks 1101-1105 of FIG. 11 and operations of blocks 1201-1203 of FIG. 12 may be optional.

Operations specific to the communication device (implemented using the structure of the block diagram of FIG. 8) will now be discussed with reference to the flow chart of FIG. 13 according to some embodiments of inventive concepts. For example, modules may be stored in memory 805 of FIG. 8, and these modules may provide instructions so that when the instructions of a module are executed by respective network equipment processing circuitry 803, processing circuitry 803 performs respective operations of the flow chart. Each of the operations described in FIG. 13 can be combined and/or omitted in any combination with each other, and it is contemplated that all such combinations fall within the spirit and scope of this disclosure.

The block diagram in FIG. 8 illustrates an embodiment of a communication device (800) which includes a processing circuitry (803) and a memory (805) coupled with the processing circuitry. The memory (805) includes instructions that when executed by the processing circuitry (803) causes the network equipment (800) to perform operations. Each of the operations described in FIG. 13 can be combined and/or omitted in any combination with each other, and it is contemplated that all such combinations fall within the spirit and scope of this disclosure. In block 1301, the communication device (800) receives (1301) a message including a protected trust information list from a network equipment. In block 1303, the communication device (800) verifies (1303) the protection of the message. In block 1305, the communication device (800) stores (1305) the protected trust information list.

In some embodiments of the communication device (800), the protected trust information list is used to determine whether one or more access networks is trusted. In some embodiments, the one or more access networks includes a non-3GPP access network or a 3GPP access network.

In some embodiments, the non-3GPP access network includes one of: a public land mobile network, PLMN, and an access technology combination; a PLMN, an access technology, and an access network identity combination; a PLMN and an access network identity combination; an access network connected to a PLMN; or a combination of (1) the PLMN and an access technology combination, (2) the PLMN, an access technology, an access network identity combination, (3) the PLMN and an access network identity combination, and/or (4) the access network connected to a PLMN.

In some embodiments of the communication device (800), the network equipment is at least one of: (1) a unified data management, UDM, equipment, (2) an authentication server function, AUSF, equipment, and/or (3) another network function equipment in a home PLMN, HPLMN.

In some embodiments of the communication device (800), the network equipment is at least one of: (1) a security anchor function, SEAF, equipment, (2) an access management function, AMF, equipment, and/or (3) another network function equipment in a visited PLMN, VPLMN.

In some embodiments of the communication device (800), the protected trust information list includes trust information associated to a list of the one or more access networks protected with a key shared with the communication device.

In some embodiments of the communication device (800), the key results from an authentication procedure performed between the communication device and a network equipment in the communication network. In some embodiments, the network equipment is one or more of the network equipment (900) or another network equipment in the communication network.

In some embodiments of the communication device (800), the authentication procedure is a primary authentication procedure.

In some embodiments of the communication device (800), the key is a key shared with the communication device and a home network or a key derived from the key shared with the communication device and the home network. the network equipment may be a visited home network equipment.

In some embodiments of the communication device (800), the key is $K_{AUSF}$ or a key derived from $K_{AUSF}$.

In some embodiments of the communication device (800), the key is a key shared between a universal subscriber identity module, USIM, of the communication device and a network equipment.

In some embodiments of the communication device (800), protection for the protected trust information list includes one or more of integrity protection, confidentiality protection, and replay protection.

Figure 13:
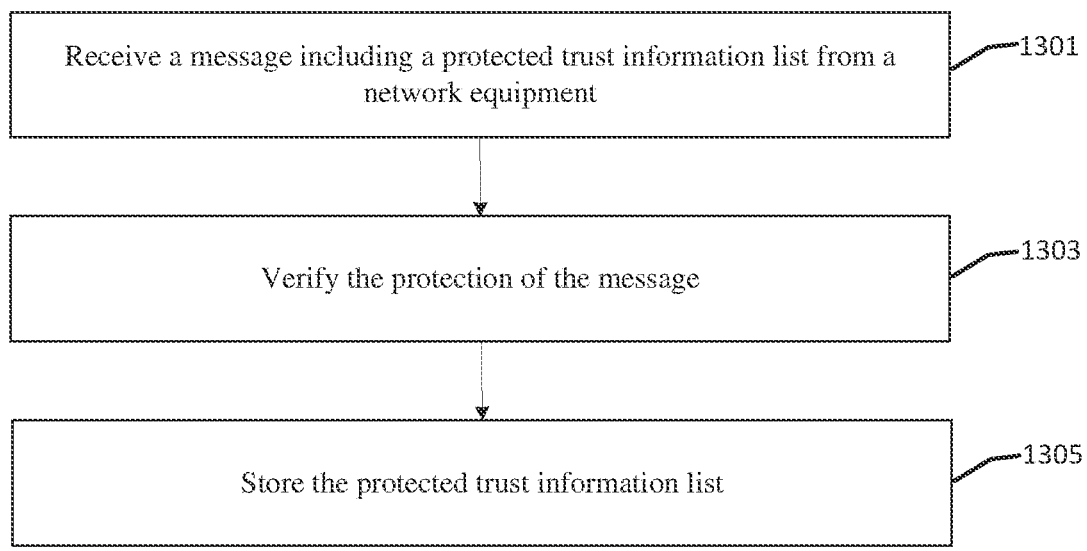
FIG. 13 is a flow chart illustrating operations of a communication device according to some embodiments of inventive concepts.

Referring to block 1301 of FIG. 13, in some embodiments of the communication device (800), the receiving (1301) a message including a protected trust information list from a network equipment is received during steering of the communication device in a VPLMN during registration. In some embodiments, a message including a protected trust information list from a network equipment may be received during steering of the communication device in a VPLMN after registration. In some embodiments, the steering includes Steering of Roaming, SoR. In some embodiments, the receiving (1301) a message including a protected trust information list from a network equipment is received via a parameters update to the communication device during a UDM control plane security procedure. In some embodiments, the parameters update includes a user equipment parameter update, UPU. In some embodiments, the receiving (1301) a message including a protected trust information list from a network equipment is received after a primary authentication.

In some embodiments of the communication device (800), the trust information indicates whether each of the one or more access networks is trusted includes a plurality of trust information indications. The plurality of trust information indications includes a trust information indication from a VPLMN, and a trust information indication from a HPLMN. In some embodiments. the trust information indication from the VPLMN is based on a decision performed by the VPLMN or the HPLMN. In some embodiments. the trust information indication from the VPLMN is received by the communication device in a secure message. In some embodiments, the HPLMN indicates to the communication device to obey the trust indication of the VPLMN based on one of: properties of a first access node via which the communication device is communicating; properties of a second access node via which the communication device will communicate; and an indication from the communication device. In some embodiments. the HPLMN indicates to the communication device to obey the trust indication of the VPLMN based on one or more factors including: a date and/or time at which the first access node is used; a policy; a type of authentication method; a subscription profile; or a device property of the first access node and/or of the second access node. In some embodiments, the first access node and the second access node each may each have a property including one or more of: a type of the access node; a type of radio access technology; a location of the access node; a software and/or hardware vendor of the access node; a software and/or hardware version of the access node; an interface supported by the access node; a security protocol supported by the access node; and an identifier of the access node. In said embodiments, the property is determined based on information obtained from the VPLMN, the HPLMN, or an external source.

In some embodiments of the communication device (800), the protected trust information includes a plurality of trust indications comprising a trust indication from a visited public land mobile network, VPLMN, and a trust indication from a home public land mobile network, HPLMN. In said embodiments, the communication device has default behavior that the trust indication from the VPLMN overrides the trust indication of the HPLMN. In some embodiments, the communication device (800) has default behavior that the trust indication from the HPLMN overrides the trust indication of the VPLMN.

Referring to FIG. 13, in various embodiments, a communication device (800) may be adapted to perform operations including receiving (1301) a message including a protected trust information list from a network equipment, verifying (1303) the protection of the message, and storing (1305) the protected trust information list. The communication device (800) of said embodiments may be adapted to perform any of the methods or operations of the communication device (800) discussed above.

In various embodiments, a computer program comprising program code to be executed by processing circuitry (803) of a communication device (800), whereby execution of the program code causes the communication device (800) to perform operations including to any of the methods or operations of the communication device (800) discussed above. The execution of the program code of said embodiments may cause the communication node (800) to perform operations according to any methods or operations of the communication device (800) discussed above.

Referring to FIG. 13, in various embodiments, a computer program product a non-transitory storage medium including program code to be executed by processing circuitry (803) of a communication device (800). Execution of the program code causes the communication node (800) to perform operations including receiving (1301) a message including a protected trust information list from a network equipment, verifying (1303) the protection of the message, and storing (1305) the protected trust information list. Referring to said computer program product, execution of the program code causes the communication device (800) to perform operations according to any methods or operations of the communication device (800) discussed above.

Aspects of the present disclosure have been described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Example embodiments are provided below. Reference numbers/letters are provided in parenthesis by way of example/illustration without limiting example embodiments to particular elements indicated by reference numbers/letters:

LISTING OF EMBODIMENTS

Embodiment 1. A method performed by a network equipment (900) of a communication network to dynamically provide trust information to a communication device (800). The method includes determining (1001) a trust information for each of one or more access networks. The trust information indicates whether each of the one or more access networks is trusted. The method further includes indicating (1003) to the communication device whether the one or more access networks is trusted for a current session or a later session.

Embodiment 2. The method of Embodiment 1, wherein the one or more access networks comprises a non-3GPP access network or a 3GPP access network.

Embodiment 3. The method of Embodiment 2, wherein the non-3GPP access network includes one of: a public land mobile network, PLMN, and an access technology combination; a PLMN, an access technology, and an access network identity combination; a PLMN and an access network identity combination; an access network connected to a PLMN; and a combination of (1) the PLMN and an access technology combination, (2) the PLMN, an access technology, an access network identity combination, (3) the PLMN and an access network identity combination, and/or (4) the access network connected to a PLMN.

Embodiment 4. The method of any of Embodiments 1 to 3, wherein the network equipment is at least one of: (1) a unified data management, UDM, equipment, (2) an authentication server function, AUSF, equipment, and/or (3) another network function equipment in a home PLMN, HPLMN.

Embodiment 5. The method of any of Embodiments 1 to 3, wherein the network equipment is at least one of: (1) a security anchor function, SEAF, equipment, (2) an access management function, AMF, equipment, and/or (3) another network function equipment in a visited PLMN, VPLMN.

Embodiment 6. The method of any of Embodiments 1 to 5, wherein the determining (1001) a trust information for each of one or more access networks, wherein the trust information indicates whether each of the one or more access networks is trusted includes obtaining (1101) a list of the one or more access networks. The determining (1001) further includes associating (1103) the trust information to each of the one or more of the access networks in the list of the one or more access networks resulting in a trust information list; and protecting (1105) the trust information list with a key shared with the communication device to obtain a protected trust information list.

Embodiment 7. The method of any of Embodiments 1 to 6, wherein the indicating (1003) to the communication device whether the one or more access networks is trusted for a current session or a later session includes sending the protected trust information list toward the communication device.

Embodiment 8. The method of any of Embodiments 6 to 7, wherein the key results from an authentication procedure performed between the communication device and a network equipment in the communication network, and wherein the network equipment is one or more of the network equipment (900) or another network equipment in the communication network.

Embodiment 9. The method of Embodiment 8, wherein the authentication procedure is a primary authentication procedure.

Embodiment 10. The method of any of Embodiments 6 to 7, wherein the key includes a key shared with the communication device and a home network or a key derived from the key shared with the communication device and the home network; and the network equipment is a visited home network equipment.

Embodiment 11. The method of any of Embodiments 6 to 9, wherein the key includes KAUSF or a key derived from KAUSF.

Embodiment 12. The method of any of Embodiments 6 to 10, wherein the key includes a key shared between a universal subscriber identity module, USIM, of the communication device and a network equipment.

Embodiment 13. The method of any of Embodiments 6 to 12, wherein the protecting (1105) the trust information list with a key shared with the communication device to obtain a protected trust information list includes transmitting the trust information list to an authentication server function, AUSF; and receiving a protected trust information list from the AUSF or a message authentication code, MAC, value for the protected trust information list.

Embodiment 14. The method of Embodiment 6 wherein the key includes a key shared with the communication device and a visited network or a key derived from the key shared with the communication device and the visited network; and the node is a visited network node.

Embodiment 15. The method of any of Embodiments 13 to 14, wherein the key includes KSEAF or a key derived from a KSEAF.

Embodiment 16. The method of any of Embodiments 6 to 15, wherein the protecting (1105) includes one or more of: integrity protection; confidentiality protection; and replay protection.

Embodiment 17. The method of any of Embodiments 7 to 16, wherein the sending the protected trust information list toward the communication device is sent toward the communication device during steering of the communication device in a VPLMN during registration.

Embodiment 18. The method of Embodiment 17, further including sending (1201) a message to the AUSF to obtain security material for protection of the trust information list; and receiving (1203) a response to the message from the AUSF with the security material.

Embodiment 19. The method of any of Embodiments 7 to 16, wherein the sending the protected trust information list toward the communication device is sent toward the communication device during steering of the communication device in a VPLMN after registration.

Embodiment 20. The method of Embodiment 19, further including sending (1201) a message to the AUSF to obtain security material for protection of the trust information list; and receiving (1203) a response to the first message form the AUSF with the security material.

Embodiment 21. The method of any of Embodiments 17 to 20, wherein the steering includes Steering of Roaming, SoR.

Embodiment 22. The method of any of Embodiments 7 to 16, wherein the sending the protected trust information list toward the communication device is sent toward the communication device via a parameters update to the communication device during a UDM control plane security procedure.

Embodiment 23. The method of Embodiment 22, wherein the parameters update includes a user equipment parameter update, UPU.

Embodiment 24. The method of any of Embodiments 22 to 23, further including sending (1201) a message to the AUSF to obtain security material for protection of the trust information list; and receiving (1203) a response to the first message form the AUSF with the security material.

Embodiment 25. The method of any of Embodiments 7 to 24, wherein the sending the protected trust information list toward the communication device is sent toward the communication device after a primary authentication.

Embodiment 26. The method of any of Embodiments 6 to 25, wherein the list is obtained where an authentication of the communication device was performed; and the sending the protected trust information list toward the communication device is sent toward the communication device using a user equipment parameter update, UPU, procedure.

Embodiment 27. The method of any of Embodiments 1 to 26, wherein the trust information indicates whether each of the one or more access networks is trusted includes a plurality of trust information indications; wherein the plurality of trust information indications includes a trust information indication from a VPLMN, and a trust information indication from a HPLMN.

Embodiment 28. The method of Embodiment 27, wherein the trust information indication from the VPLMN is based on a decision performed by the VPLMN or the HPLMN.

Embodiment 29. The method of any of Embodiments 27 to 128, wherein the trust information indication from the VPLMN is sent toward the communication device in a secure message.

Embodiment 30. The method of any of the Embodiments 27 to 29, wherein the HPLMN indicates to the communication device to obey the trust indication of the VPLMN based on one of: of a first access node via which the communication device is communicating; properties of a second access node via which the communication device will communicate; and an indication from the communication device.

Embodiment 31. The method of Embodiment 30, wherein the HPLMN indicates to the communication device to obey the trust indication of the VPLMN based on one or more factors including a date and/or time at which the first access node is used; a policy; a type of authentication method; a subscription profile; a device property of the first access node and/or of the second access node.

Embodiment 32. The method of any of Embodiments 30 to 31, wherein the first access node and the second access node each have a property including one or more of: a type of the access node; a type of radio access technology; a location of the access node; a software and/or hardware vendor of the access node; a software and/or hardware version of the access node; an interface supported by the access node; a security protocol supported by the access node; and an identifier of the access node.

Embodiment 33. The method of Embodiment 32, wherein the property is determined based on information obtained from the VPLMN, the HPLMN, or an external source.

Embodiment 34. A network equipment (900) including processing circuitry (903); and memory (905) coupled with the processing circuitry. The memory includes instructions that when executed by the processing circuitry causes the network equipment to perform operations including determining (1001) a trust information for each of one or more access networks. The trust information indicates whether each of the one or more access networks is trusted. The operations further include indicating (1003) to the communication device whether the one or more access networks is trusted for a current session or a later session.

Embodiment 35. The network equipment (900) of Embodiment 34, wherein the memory includes instructions that when executed by the processing circuitry causes the network equipment to perform operations according to any of Embodiments 2 to 33.

Embodiment 36. A network equipment (900) adapted to perform operations including determining (1001) a trust information for each of one or more access networks, wherein the trust information indicates whether each of the one or more access networks is trusted; and indicating (1003) to the communication device whether the one or more access networks is trusted for a current session or a later session.

Embodiment 37. The network equipment (900) of Embodiment 36 adapted to perform according to any of Embodiments 2 to 33.

Embodiment 38. A computer program including program code to be executed by processing circuitry (903) of a network equipment (900), whereby execution of the program code causes the network equipment (900) to perform operations including determining (1001) a trust information for each of one or more access networks. The trust information indicates whether each of the one or more access networks is trusted. The operations further include indicating (1003) to the communication device whether the one or more access networks is trusted for a current session or a later session.

Embodiment 39. The computer program of Embodiment 38 whereby execution of the program code causes the network equipment (900) to perform operations according to any of Embodiments 2 to 33.

Embodiment 40. A computer program product including a non-transitory storage medium including program code to be executed by processing circuitry (903) of a network equipment (900), whereby execution of the program code causes the network equipment (900) to perform operations including determining (1001) a trust information for each of one or more access networks. The trust information indicates whether each of the one or more access networks is trusted. The operations further include indicating (1003) to the communication device whether the one or more access networks is trusted for a current session or a later session.

Embodiment 41. The computer program product of Embodiment 40 whereby execution of the program code causes the network equipment (900) to perform operations according to any of Embodiments 2 to 33.

Embodiment 42. A method performed by a communication device (800) of a communication network to dynamically receive trust information. The method includes receiving (1401) a message including a protected trust information list from a network equipment. The method further includes verifying (1403) the protection of the message; and storing (1405) the protected trust information list.

Embodiment 43. The method of Embodiment 42, further including using the protected trust information list to determine whether one or more access networks is trusted.

Embodiment 44. The method of any of Embodiments 42 to 43, wherein the one or more access networks comprises a non-3GPP access network or a 3GPP access network.

Embodiment 45. The method of Embodiment 44, wherein the non-3GPP access network includes one of: a public land mobile network, PLMN, and an access technology combination; a PLMN, an access technology, and an access network identity combination; a PLMN and an access network identity combination; an access network connected to a PLMN; and a combination of (1) the PLMN and an access technology combination, (2) the PLMN, an access technology, an access network identity combination, (3) the PLMN and an access network identity combination, and/or (4) the access network connected to a PLMN.

Embodiment 46. The method of any of Embodiments 42 to 45, wherein the network equipment is at least one of: (1) a unified data management, UDM, equipment, (2) an authentication server function, AUSF, equipment, and/or (3) another network function equipment in a home PLMN, HPLMN.

Embodiment 47. The method of any of Embodiments 42 to 45, wherein the network equipment is at least one of: (1) a security anchor function, SEAF, equipment, (2) an access management function, AMF, equipment, and/or (3) another network function equipment in a visited PLMN, VPLMN.

Embodiment 45. The method of any of Embodiments 42 to 47, wherein the protected trust information list includes trust information associated to a list of the one or more access networks protected with a key shared with the communication device.

Embodiment 46. The method of Embodiment 45, wherein the key results from an authentication procedure performed between the communication device and a network equipment in the communication network, and wherein the network equipment is one or more of the network equipment (900) or another network equipment in the communication network.

Embodiment 47. The method of Embodiment 46, wherein the authentication procedure is a primary authentication procedure.

Embodiment 48. The method of any of Embodiments 46 to 47, wherein the key includes a key shared with the communication device and a home network or a key derived from the key shared with the communication device and the home network; and the network equipment is a visited home network equipment.

Embodiment 49. The method of any of Embodiments 46 to 48, wherein the key includes KAUSF or a key derived from KAUSF.

Embodiment 50. The method of any of Embodiments 46 to 49, wherein the key includes a key shared between a universal subscriber identity module, USIM, of the communication device and a network equipment.

Embodiment 51. The method of any of Embodiments 42 to 50, wherein protection for the protected trust information list includes one or more of: integrity protection; confidentiality protection; and replay protection.

Embodiment 52. The method of any of Embodiments 42 to 51, wherein the receiving (1401) a message including a protected trust information list from a network equipment is received during steering of the communication device in a VPLMN during registration.

Embodiment 53. The method of any of Embodiments 42 to 51, wherein the receiving (1401) a message including a protected trust information list from a network equipment is received during steering of the communication device in a VPLMN after registration.

Embodiment 54. The method of any of Embodiments 52 to 53, wherein the steering includes Steering of Roaming, SoR.

Embodiment 55. The method of any of Embodiments 42 to 51, wherein the receiving (1401) a message including a protected trust information list from a network equipment is received via a parameters update to the communication device during a UDM control plane security procedure.

Embodiment 56. The method of Embodiment 55, wherein the parameters update includes a user equipment parameter update, UPU.

Embodiment 57. The method of any of Embodiments 42 to 51, wherein the receiving (1401) a message including a protected trust information list from a network equipment is received after a primary authentication.

Embodiment 58. The method of any of Embodiments 42 to 57, wherein the trust information indicates whether each of the one or more access networks is trusted includes a plurality of trust information indications; wherein the plurality of trust information indications includes a trust information indication from a VPLMN, and a trust information indication from a HPLMN.

Embodiment 59. The method of Embodiment 58, wherein the trust information indication from the VPLMN is based on a decision performed by the VPLMN or the HPLMN.

Embodiment 60. The method of any of Embodiments 58 to 59, wherein the trust information indication from the VPLMN is received by the communication device in a secure message.

Embodiment 61. The method of any of the Embodiments 58 to 59, wherein the HPLMN indicates to the communication device to obey the trust indication of the VPLMN based on one of: properties of a first access node via which the communication device is communicating; properties of a second access node via which the communication device will communicate; and an indication from the communication device.

Embodiment 62. The method of Embodiment 61, wherein the HPLMN indicates to the communication device to obey the trust indication of the VPLMN based on one or more factors including a date and/or time at which the first access node is used; a policy; a type of authentication method; a subscription profile; a device property of the first access node and/or of the second access node.

Embodiment 63. The method of any of Embodiments 61 to 62, wherein the first access node and the second access node each have a property including one or more of: a type of the access node; a type of radio access technology; a location of the access node; a software and/or hardware vendor of the access node; a software and/or hardware version of the access node; an interface supported by the access node; a security protocol supported by the access node; and an identifier of the access node.

Embodiment 64. The method of Embodiment 63, wherein the property is determined based on information obtained from the VPLMN, the HPLMN, or an external source Embodiment 65. The method of any of Embodiments 42 to 64, wherein the protected trust information includes a plurality of trust indications including a trust indication from a visited public land mobile network, VPLMN, and a trust indication from a home public land mobile network, HPLMN.

Embodiment 66. The method of Embodiment 65, wherein the communication device has default behavior that the trust indication from the VPLMN overrides the trust indication of the HPLMN.

Embodiment 67. The method of Embodiment 65, wherein the communication device has default behavior that the trust indication from the HPLMN overrides the trust indication of the VPLMN.

Embodiment 68. A communication device (800) adapted to perform operations including receiving (1401) a message including a protected trust information list from a network equipment; verifying (1403) the protection of the message; and storing (1405) the protected trust information list.

Embodiment 69. The communication device (800) of Embodiment 68 adapted to perform according to any of Embodiments 42 to 67.

Embodiment 70. A computer program including program code to be executed by processing circuitry (803) of a communication device (800), whereby execution of the program code causes the communication device (800) to perform operations comprising to any of Embodiments 42 to 67.

Embodiment 71. The computer program of Embodiment 70 whereby execution of the program code causes the communication node (800) to perform operations according to any of Embodiments 42 to 67.

Embodiment 72. A computer program product including a non-transitory storage medium including program code to be executed by processing circuitry (803) of a communication device (800), whereby execution of the program code causes the communication node (800) to perform operations including receiving (1401) a message including a protected trust information list from a network equipment. The operations further include verifying (1403) the protection of the message; and storing (1405) the protected trust information list.

Embodiment 73. The computer program product of Embodiment 72 whereby execution of the program code causes the communication device (800) to perform operations according to any of Embodiments 42 to 67.

References are identified below.

[1] 3GPP TS 23.501 v.16.2.0.
[2] 3GPP TS 23.502 v.16.2.0.
[3] 3GPP TS 33.402 v.15.1.0.
[4] 3GPP TS 33.501 v.16.0.0.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 14:
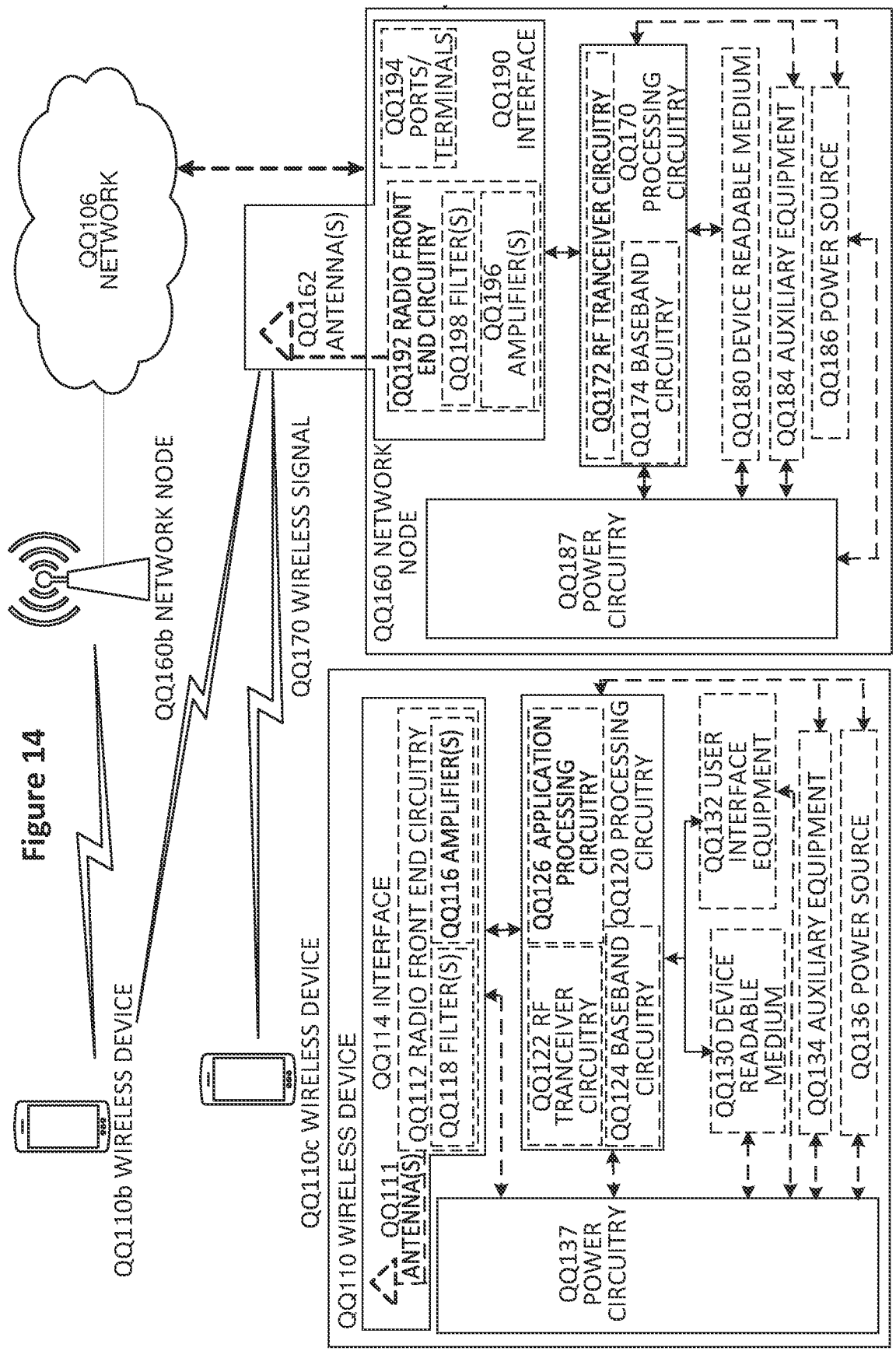
FIG. 14 is a block diagram of a wireless network in accordance with some embodiments.

FIG. 14 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 14. For simplicity, the wireless network of FIG. 14 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 14, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 141 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 14 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 15:
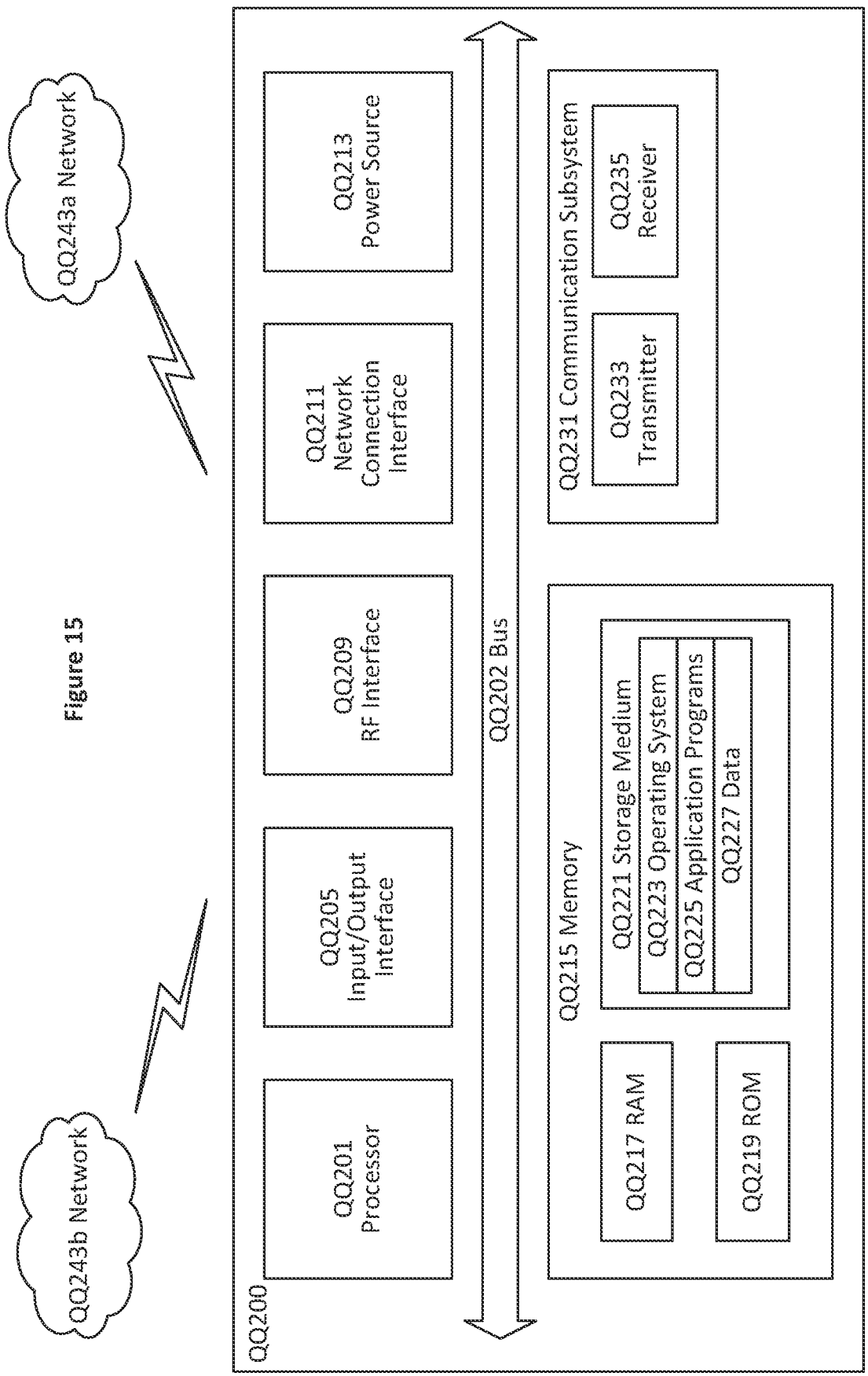
FIG. 15 is a block diagram of a user equipment in accordance with some embodiments.

FIG. 15 illustrates a user Equipment in accordance with some embodiments.

FIG. 15 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 15, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 15 is a UE, the components discussed herein are equally applicable to a WD, and vice-versa.

In FIG. 15, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 15, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 16:
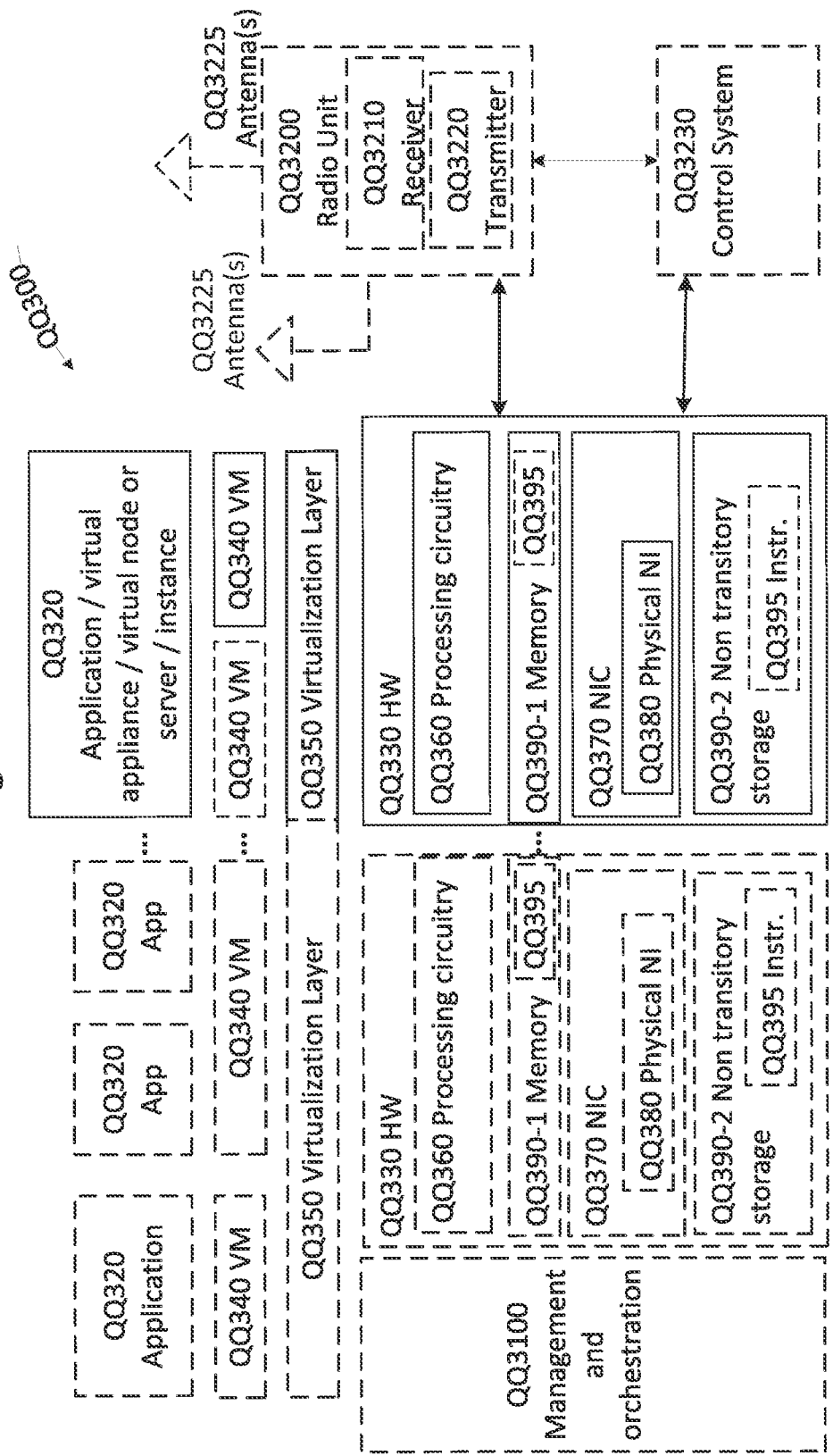
FIG. 16 is a block diagram of a virtualization environment in accordance with some embodiments.

FIG. 16 illustrates a virtualization environment in accordance with some embodiments.

FIG. 16 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 16, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 16.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 17:
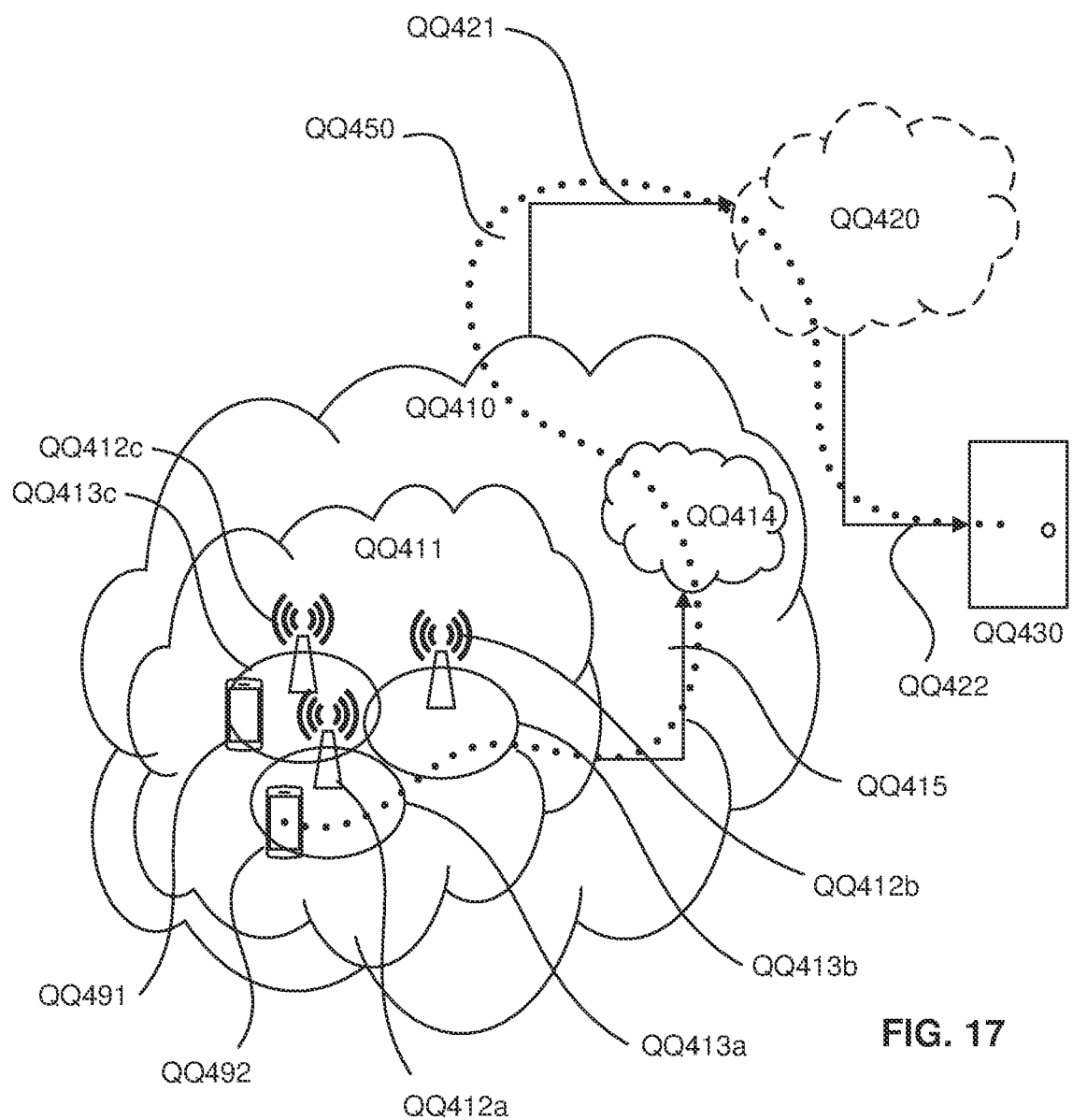
FIG. 17 is a block diagram of a telecommunication network connected via an intermediate network to a host computer in accordance with some embodiments.

FIG. 17 illustrates a telecommunication network connected via an intermediate network to a host computer in accordance with some embodiments.

With reference to FIG. 17, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 17 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signalling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 18:
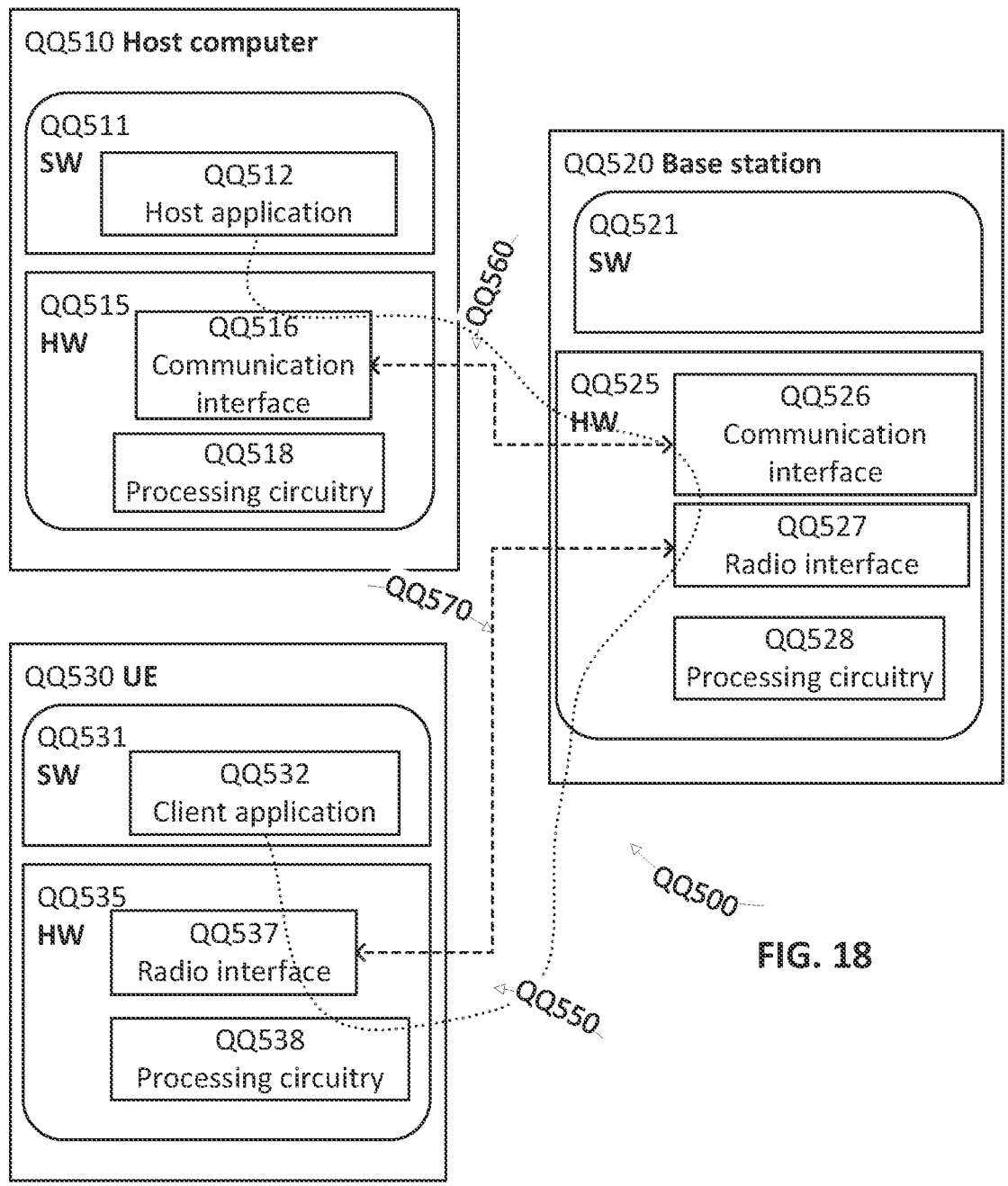
FIG. 18 is a block diagram of a host computer communicating via a base station with a user equipment over a partially wireless connection in accordance with some embodiments.

FIG. 18 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 18. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 18) served by base station QQ520. Communication interface QQ526 may be configured to facilitate connection QQ560 to host computer QQ510. Connection QQ560 may be direct or it may pass through a core network (not shown in FIG. 18) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 18 may be similar or identical to host computer QQ430, one of base stations QQ412a, QQ412b, QQ412c and one of UEs QQ491, QQ492 of FIG. 17, respectively. This is to say, the inner workings of these entities may be as shown in FIG. 18 and independently, the surrounding network topology may be that of FIG. 17.

In FIG. 18, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 19:
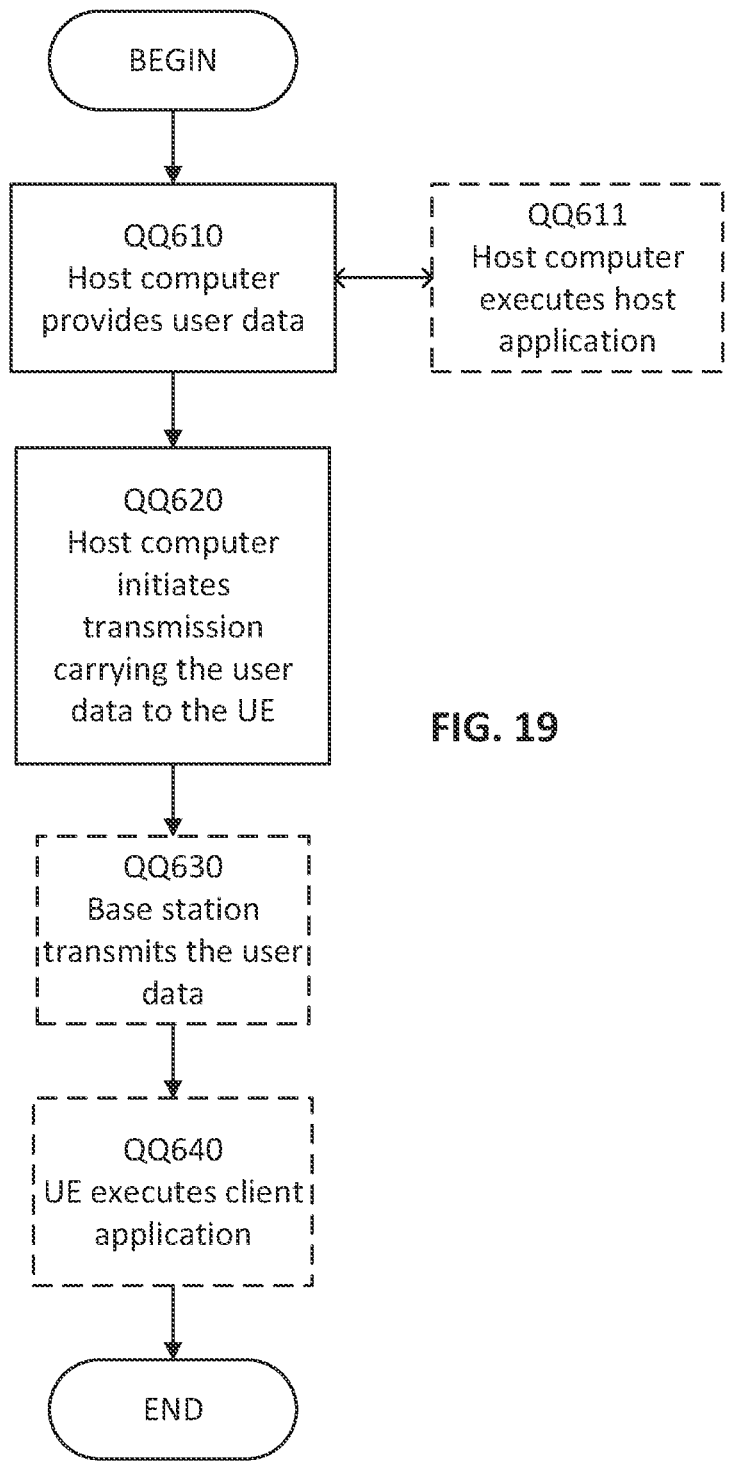
FIG. 19 is a block diagram of methods implemented in a communication system including a host computer, a base station and a user equipment in accordance with some embodiments.

FIG. 19 illustrates methods implemented in a communication system including a host computer, a base station and a user equipment in accordance with some embodiments FIG. 19 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 19 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 20:
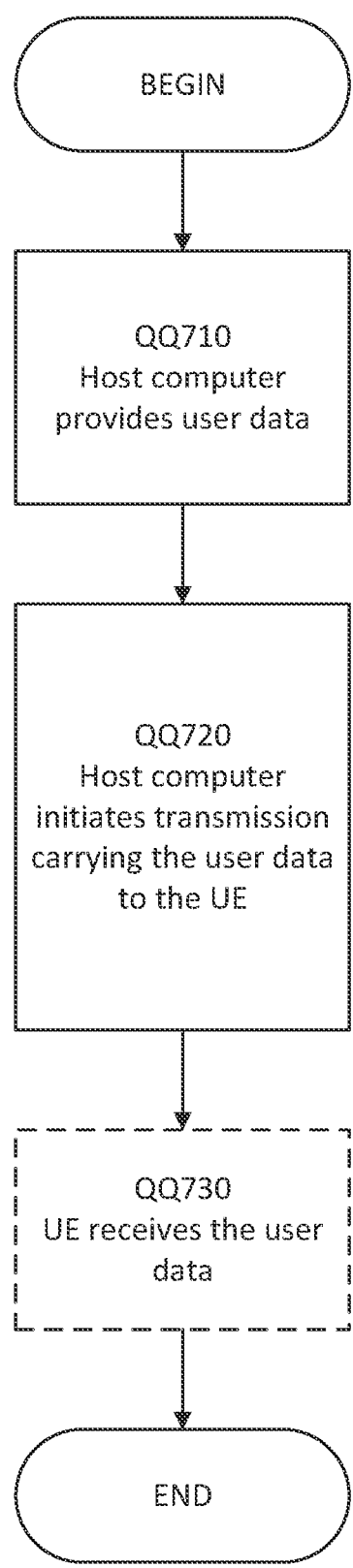
FIG. 20 is a block diagram of methods implemented in a communication system including a host computer, a base station and a user equipment in accordance with some embodiments.

FIG. 20 illustrates methods implemented in a communication system including a host computer, a base station and a user equipment in accordance with some embodiments.

FIG. 20 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 20 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 21:
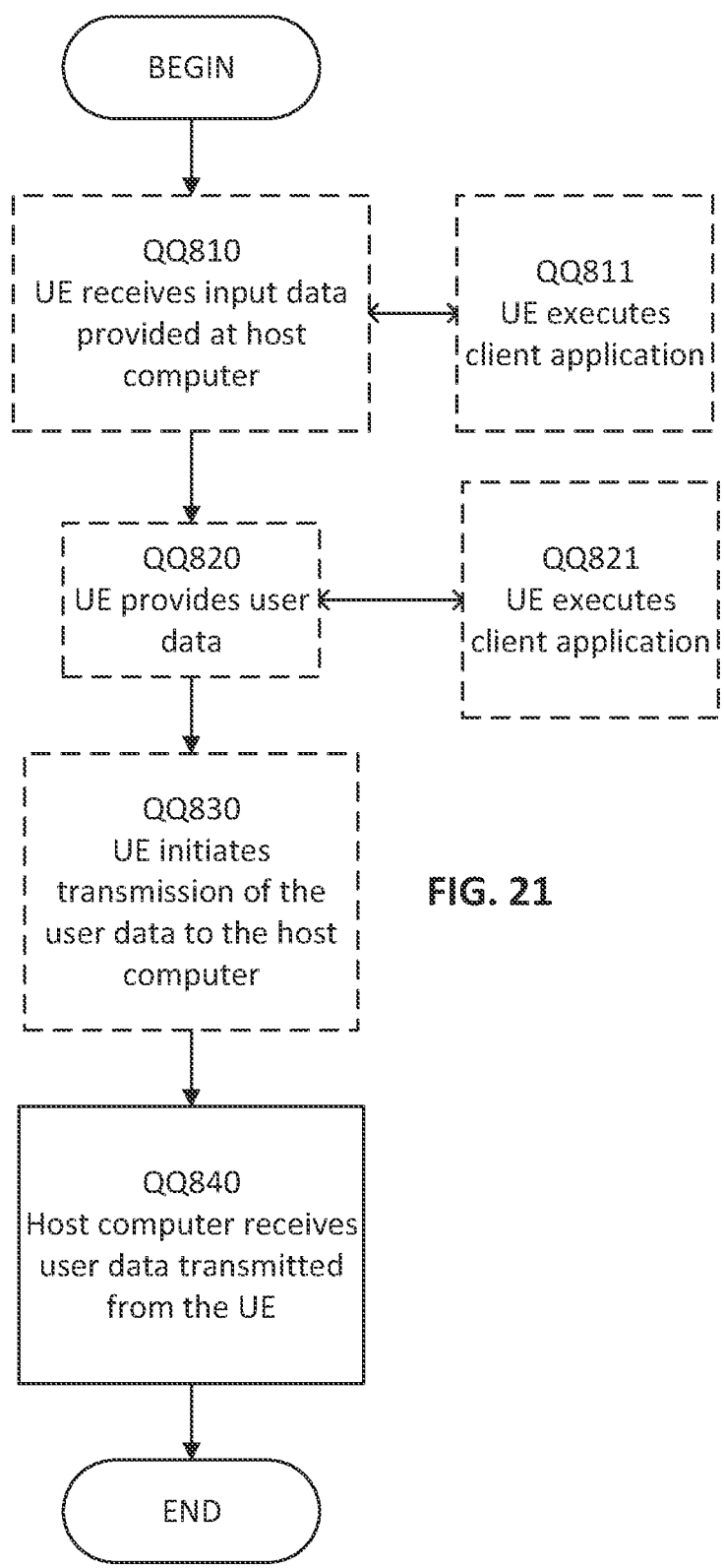
FIG. 21 is a block diagram of methods implemented in a communication system including a host computer, a base station and a user equipment in accordance with some embodiments.

FIG. 21 illustrates methods implemented in a communication system including a host computer, a base station and a user equipment in accordance with some embodiments FIG. 21 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 21 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 22:
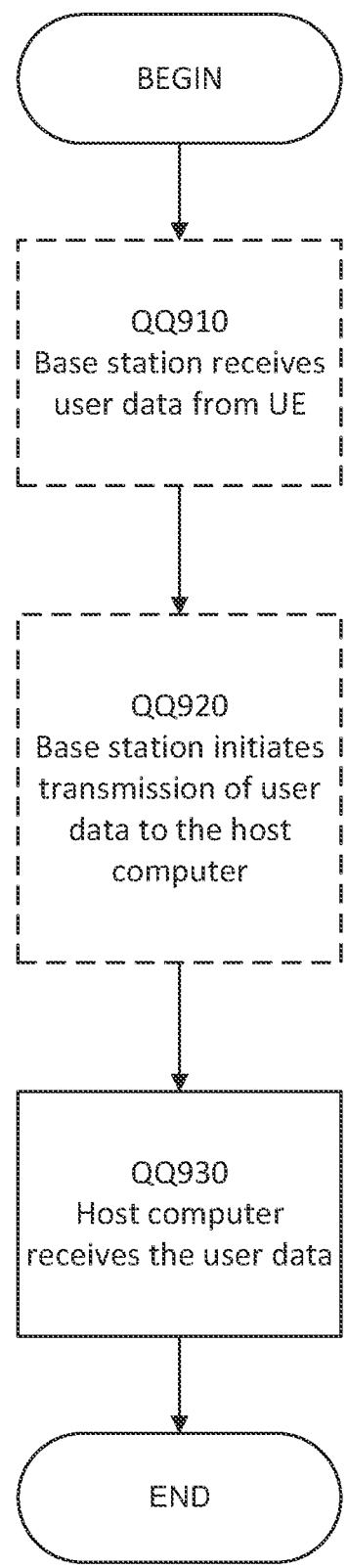
FIG. 22 is a block diagram of methods implemented in a communication system including a host computer, a base station and a user equipment in accordance with some embodiments.

FIG. 22 illustrates methods implemented in a communication system including a host computer, a base station and a user equipment in accordance with some embodiments FIG. 22 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 22 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

3GPP 3rd Generation Partnership Project
5G 5th Generation
CDMA Code Division Multiplexing Access
DL Downlink
E-SMLC Evolved-Serving Mobile Location Centre
eNB E-UTRAN NodeB
E-SMLC evolved Serving Mobile Location Center
E-UTRAN Evolved UTRAN
gNB Base station in NR
GSM Global System for Mobile communication
LOS Line of Sight
LTE Long-Term Evolution
MAC Medium Access Control
MDT Minimization of Drive Tests
MME Mobility Management Entity
MSC Mobile Switching Center
NR New Radio
OSS Operations Support System
O&M Operation and Maintenance
PLMN Public Land Mobile Network
RAN Radio Access Network
RAT Radio Access Technology
RNC Radio Network Controller
SON Self Optimized Network
UE User Equipment
UL Uplink
UMTS Universal Mobile Telecommunication System
USIM Universal Subscriber Identity Module
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method performed by a network equipment of a communication network to dynamically provide trust information to a communication device registered to or being registered the communication network, the method comprising:
   determining a trust information for each of one or more access networks, wherein the trust information indicates whether each of the one or more access networks is trusted, wherein the determining a trust information for each of one or more access networks comprises protecting a trust information list with a key shared with the communication device to obtain a protected trust information list; and
   indicating to the communication device whether the one or more access networks is trusted for a current session or a later session, wherein the indicating to the communication device whether the one or more access networks is trusted for a current session or a later session comprises sending the protected trust information list toward the communication device.

2. The method of claim 1, wherein the determining a trust information for each of one or more access networks comprises:
   obtaining a list of the one or more access networks; and
   associating the trust information to each of the one or more of the access networks in the list of the one or more access networks resulting in the trust information list.

3. The method of claim 1, wherein the sending the protected trust information list toward the communication device is sent toward the communication device during steering of the communication device in a visited public land mobile network (VPLMN) during registration.

4. The method of claim 1, wherein the sending the protected trust information list toward the communication device is sent toward the communication device during steering of the communication device in a visited public land mobile network (VPLMN) after registration.

5. The method of claim 4, further comprising:
   sending a message to an authentication server function (AUSF) to obtain security material for protection of the trust information list; and
   receiving a response to the first message from the AUSF with the security material.

6. The method of claim 1, wherein the sending the protected trust information list toward the communication device is sent toward the communication device via a parameters update to the communication device during a unified data management (UDM) control plane security procedure.

7. The method of claim 6, wherein the parameters update comprises a user equipment parameter update (UPU).

8. The method of claim 6, further comprising:
   sending a message to an authentication server function (AUSF) to obtain security material for protection of the trust information list; and
   receiving a response to the first message from the AUSF with the security material.

9. The method of claim 1, wherein the sending the protected trust information list toward the communication device is sent toward the communication device after a primary authentication.

10. The method of claim 2, wherein the list is obtained where an authentication of the communication device was performed; and
    the sending the protected trust information list toward the communication device is sent toward the communication device using a user equipment parameter update (UPU) procedure.

11. A network equipment comprising:
    processing circuitry; and
    memory coupled with the processing circuitry, wherein the memory includes instructions that when executed by the processing circuitry causes the network equipment to perform operations comprising:
    determining a trust information for each of one or more access networks, wherein the trust information indicates whether each of the one or more access networks is trusted, wherein the determining a trust information for each of one or more access networks comprises protecting a trust information list with a key shared with the communication device to obtain a protected trust information list; and
    indicating to a communication device registered or being registered with a communication network whether the one or more access networks is trusted for a current session or a later session, wherein the indicating to the communication device whether the one or more access networks is trusted for a current session or a later session comprises sending the protected trust information list toward the communication device.

12. A method performed by a communication device registered or being registered with a communication network to dynamically receive trust information, the method comprising:
    receiving a message including a protected trust information list from a network equipment;
    verifying the protection of the message; and
    storing the protected trust information list.

13. The method of claim 12, wherein the receiving a message including a protected trust information list from a network equipment is received during steering of the communication device in a visited public land mobile network (VPLMN) after registration.

14. The method of claim 12, wherein the receiving a message including a protected trust information list from a network equipment is received via a parameters update to the communication device during a unified data management (UDM) control plane security procedure.

15. The method of claim 14, wherein the parameters update comprises a user equipment parameter update (UPU).

16. The method of claim 12, wherein the receiving a message including a protected trust information list from a network equipment is received after a primary authentication.

17. The method of claim 12, wherein the protected trust information comprises a plurality of trust indications comprising a trust indication from a visited public land mobile network (VPLMN) and a trust indication from a home public land mobile network (HPLMN).

18. The method of claim 17, wherein the communication device has default behavior that the trust indication from the VPLMN overrides the trust indication of the HPLMN.

19. A communication device registered or being registered with a communication network adapted to perform operations comprising:
   receive a message including a protected trust information list from a network equipment;
   verify the protection of the message; and
   store the protected trust information list.

* * * * *